United States Patent
Thomas et al.

(10) Patent No.: US 11,108,686 B1
(45) Date of Patent: Aug. 31, 2021

(54) PORT ALLOCATION AT DISTRIBUTED NETWORK ADDRESS TRANSLATORS

(71) Applicant: Amazon Technologies, Inc., Seattle, WA (US)

(72) Inventors: Christopher Thomas, Seattle, WA (US); Bilal Hassan Khan, Seattle, WA (US); Alexey Kuznetsov, Seattle, WA (US); Artem Kryvokrysenko, Seattle, WA (US); Harshit Vijayvargia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/456,907

(22) Filed: Jun. 28, 2019

(51) Int. Cl.
*H04L 12/721* (2013.01)
*H04L 12/743* (2013.01)
*H04L 29/12* (2006.01)

(52) U.S. Cl.
CPC .............. *H04L 45/34* (2013.01); *H04L 45/38* (2013.01); *H04L 45/7453* (2013.01); *H04L 61/2517* (2013.01)

(58) Field of Classification Search
CPC ..... H04L 45/34; H04L 45/38; H04L 61/2517; H04L 45/7453; H04L 61/2514
See application file for complete search history.

(56) References Cited

U.S. PATENT DOCUMENTS

| | | | |
|---|---|---|---|
| 6,993,021 B1 | 1/2006 | Chuah et al. | |
| 7,782,782 B1 | 8/2010 | Ferguson et al. | |
| 7,865,586 B2 | 1/2011 | Cohn | |
| 8,199,651 B1 | 6/2012 | Schrempp et al. | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1 | 4/2014 | Maxwell et al. | |
| 8,873,556 B1 | 10/2014 | Zuk et al. | |
| 2008/0025218 A1 | 1/2008 | Liu | |
| 2008/0228932 A1 | 9/2008 | Monette et al. | |
| 2015/0063360 A1 | 3/2015 | Thakkar et al. | |

(Continued)

FOREIGN PATENT DOCUMENTS

WO 2008110955 9/2008

OTHER PUBLICATIONS

"A Brief Primer on Anycast", Matthew Prince, Oct. 21, 2011, pp. 1-4.

(Continued)

*Primary Examiner* — Dady Chery
(74) *Attorney, Agent, or Firm* — Robert C. Kowert; Kowert, Hood, Munyon, Rankin & Goetzel, P.C.

(57) ABSTRACT

A node of a network address translator obtains a first packet. A particular port number to be used as a substitute port for a packet flow associated with the first packet is determined using at least a first intermediate hash result, a particular flow hash value range assigned to the node, and a lookup table. The first intermediate hash result is obtained from a flow tuple of the first packet, and the lookup table comprises an entry indicating a mapping between the particular port number and a second intermediate hash result. A second packet, in which the source port is the set to the substitute port number, is transmitted to a recipient indicated in the first packet.

20 Claims, 12 Drawing Sheets

(56) References Cited

U.S. PATENT DOCUMENTS

| | | | |
|---|---|---|---|
| 2015/0063364 A1 | 3/2015 | Thakkar et al. | |
| 2015/0263899 A1 | 9/2015 | Tubaltsev et al. | |
| 2015/0263946 A1 | 9/2015 | Tubaltsev et al. | |
| 2015/0281081 A1 | 10/2015 | Rajahalme | |
| 2015/0281125 A1 | 10/2015 | Koponen et al. | |
| 2017/0244637 A1* | 8/2017 | Singhal | H04L 45/7453 |

OTHER PUBLICATIONS

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al "Improving Datacenter Performance and Robustness with Multipath TCP" SIGCOMM'11, Aug. 15-19, 2011, pp. 1-12.

Albert Greenberg, et al "VL2: a Scalable and Flexible Data Center Network" Communications of the ACM, vol. 54, No. 3, Mar. 2011, pp. 1-10.

Chuanxiong Guo, et al "BCube: a High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 14/565,164, filed Dec. 9, 2014, Tobias Lars-Olov Holgers, et al.

U.S. Appl. No. 14/526,410, filed Oct. 28, 2014, Eric Jason Brandwine.

U.S. Appl. No. 14/736,165, filed Jun. 10, 2015, Colm Mac-Carthaigh.

U.S. Appl. No. 14/736,167, filed Jun. 10, 2015, Colm Mac-Carthaigh.

U.S. Appl. No. 14/736,172, filed Jun. 10, 2015, Colm Mac-Carthaigh.

U.S. Appl. No. 16/129,632, filed Sep. 12, 2018, Reuben Alexander Hawkins et al.

* cited by examiner

Flow hash SMN assignment algorithm 401

Port set SMN assignment algorithm 481

For a given 5-tuple, the use of PRH algorithm results and randomized lookup tables in deterministic assignment of N (approximately) equal-sized sets 481 of port numbers to N respective state manager nodes for allocation

PORT ALLOCATION AT DISTRIBUTED NETWORK ADDRESS TRANSLATORS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more compute instances (e.g., "guest" virtual machines) hosted by the single virtualization host. Each such compute instance may represent a software simulation acting as a distinct logical computing system that provides users with the illusion that they are the sole operators of a given hardware computing resource, while also providing application isolation and security among the various compute instances.

For many network-accessible services and applications, especially in virtualized computing environments, packet processing or transformation tasks (e.g., involving modifications of one or more packet headers) may have to be performed to route network packets between the resources involved in requesting operations and the resources involved in performing the requested operations. For example, in some scenarios the source network address and/or source port indicated in packets flowing from multiple traffic sources to a particular destination via an intermediary networking device may have to be substituted, so that the traffic in the reverse direction can be directed first to the intermediary network device from the destination, and then from the intermediary to the appropriate traffic source. Such types of transformation operations, which may in some cases require the selection of substitute port numbers, represent one example of network address translation (NAT).

Figure 1:
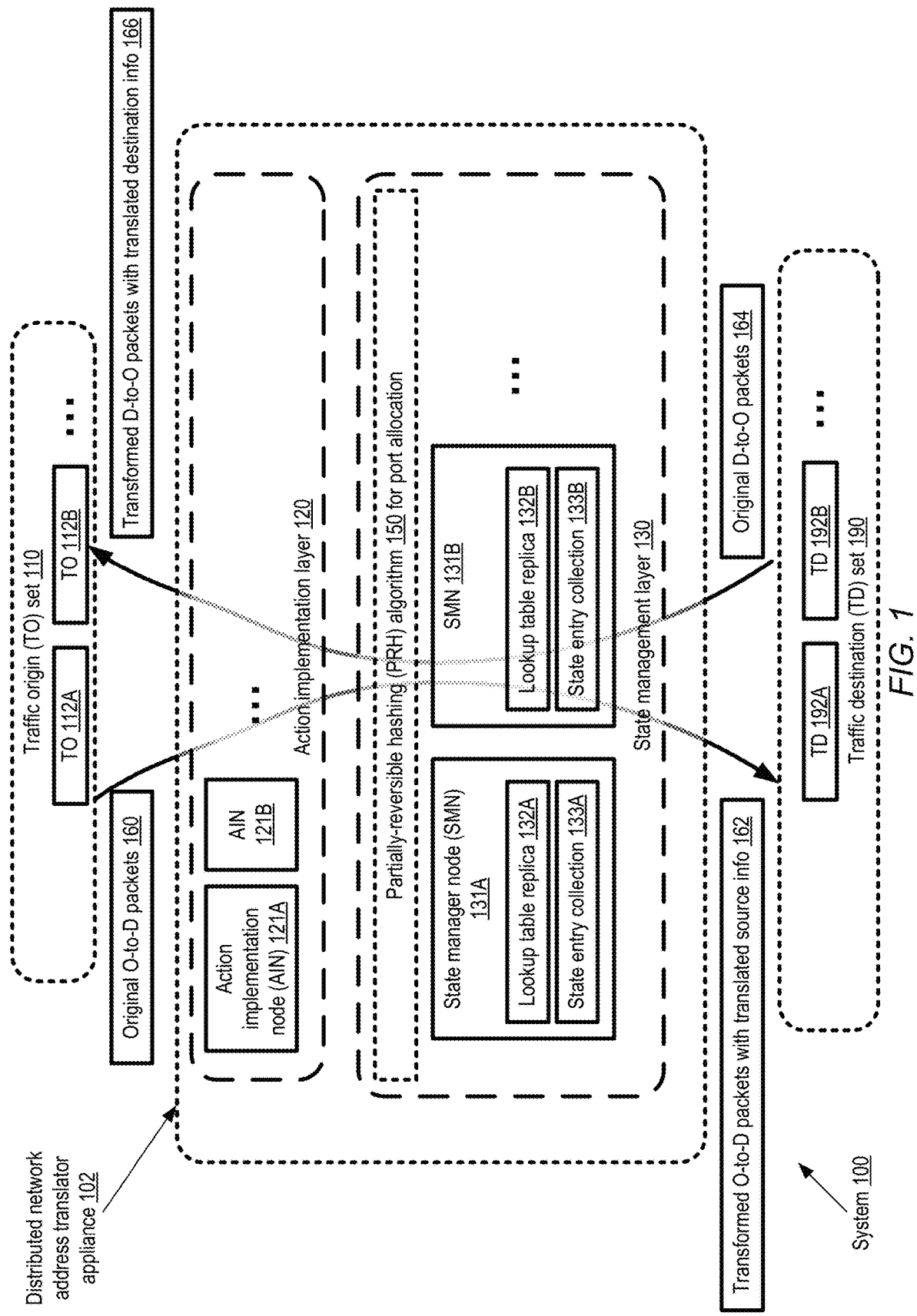
FIG. 1 illustrates an example system environment in which a partially-reversible hashing algorithm may be employed for port allocation at a distributed network address translator appliance, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficient and consistent port allocation as part of the operations of a distributed network address translator (DNAT) which may be employed for various types of applications or network-accessible services. A distributed network address translator may comprise a plurality of resources arranged in several logical layers in some embodiments, including for example a state management layer and an action implementation layer. Resources of the state management layer, referred to as state manager nodes (SMNs), may be responsible for a number of functions in some embodiments, including storing flow state metadata records for packet flows processed at the DNAT, allocating substitute ports for packets, and so on. Resources of the action implementation layer, referred to as action implementation nodes (AINs), may be responsible for efficiently applying address translation logic to received packets after decisions regarding the specifics of the address translation for a given packet flow have been reached, e.g., based on flow state metadata generated at the SMNs. A DNAT may also be referred to as a network address translator appliance in some embodiments, with different instances of the appliance being configured for respective sets of source and destination traffic endpoints.

A given packet flow may be distinguished from other packet flows based on an identifier generated from a tuple of packet properties in some embodiments, e.g., including (for a given direction of traffic between a pair of resources or endpoints) the source network address, the source port, the destination network address, the destination port, the networking protocol being used, and a unique identifier of the particular DNAT being used (e.g., an identifier of a virtual network interface which may be assigned to the DNAT). Such a tuple of six packet properties may be referred to as a 6-tuple. Note that although a 6-tuple comprising the elements (source address, source port, destination address, destination port, network protocol, DNAT ID) are used as the example packet property combination used to distinguish flows from each other in much of this description, other combinations may be used in some embodiments—e.g., the DNAT ID may not necessarily be used in some embodiments, or other types of identifiers (such as identifiers of a client of a network function virtualization service on whose behalf the packets are transmitted) may be included in the packet property combination used for distinguishing flows. The techniques for consistent port allocation described herein may be used successfully in various embodiments in which the packet properties used to distinguish flows include at least the source and destination network addresses.

In one embodiment, individual nodes of a DNAT, such as an SMN or an AIN, may be implemented using a combination of hardware and software at one or more computing devices. In some embodiments, a given node of a DNAT may perform flow state management operations as well as address translation actions—that is, SMN and AIN functionality may be combined at such nodes and need not necessarily be performed at distinct computing devices. In at least one embodiment, a DNAT may be implemented using a network function virtualization service of a provider network, which can be employed to perform a variety of packet processing tasks in addition to network address translation, e.g., including tasks related to load balancing, multicast, unicast, enabling secure connectivity between isolated virtual networks established at the provider network, and so on.

According to some embodiments, respective flow identifiers based on 6-tuples of the packet flows directed to a DNAT may be mapped using one or more hash functions to individual non-negative integers of a range of non-negative integers referred to as the flow hash value range. The individual non-negative integer may be referred to as the flow hash value of the packet flow; for example, in some embodiments in which 32-bit values are generated by the hash function(s), a flow hash value may comprise an integer between 0 and $2^{32}-1$ (the flow hash value range). Note that although ranges such as 0 to $2^{32}-1$ for generated hash values and 0 to $2^{16}-1$ for port numbers are used herein as examples, the described techniques for port allocation may be used with equal success for other ranges of hash values and port numbers in various embodiments. In some embodiments, each of the plurality of state manager nodes (SMNs) of a DNAT may be assigned a contiguous non-overlapping sub-range of the overall flow hash value range, such that a given SMN is responsible for generating and/or storing flow state metadata entries for those (and only those) packet flows that are mapped to the given SMN's sub-range. Consider a "toy" example scenario in which the state management layer of the DNAT comprises four SMNs (SMN0, SMN1, SMN2 and SMN3), and the flow hash value range is 0 to 15. In such a scenario, a sub-range comprising (0,1,2,3) may be assigned to SMN0, a sub-range comprising (4,5,6,7) may be assigned to SMN1, a sub-range comprising (8,9,10,11) may be assigned to SMN2, and the remaining sub-range (12,13,14, 15) may be assigned to SMN3. SMN0 may be responsible for flow state metadata entries of flows whose 6-tuples are mapped to any of the integers 0, 1, 2 or 3, SMN1 may be responsible for flow state metadata entries of flows whose 6-tuples are mapped to any of the integers 4, 5, 6 or 7, and so on. In at least some embodiments, the mappings between the flow hash value sub-ranges and the individual SMNs may be provided to each SMN of a given DNAT appliance, e.g., during an initialization phase of the appliance.

When the first packet of a particular flow, such as a transmission control protocol (TCP) SYN packet initiating a new connection, is received at a DNAT, a flow state metadata entry may not yet exist for the packet's flow, so a new entry may be generated in at least some embodiments. Flow state metadata entries generated and stored at the SMNs of the DNAT may for example be implemented as key-value pairs in some embodiments, with the key for a given received packet flow's entry being based on at least a portion of the received packet's flow identifier 6-tuple. Such a key may be referred to as a 6-tuple ingress key in some embodiments. The value portion of a flow metadata entry may include, for example, at least a 6-tuple identifying the destination to which the packets of the flow are to be routed, and indicating a substituted source network address and source port for the flow. For packets of a given bi-directional communication, e.g., between a client C1 and a server S1, a respective flow state metadata entry may be generated and stored for each direction (a "forward" direction with respect to C1 (from C1 to S1), and the "reverse" direction (from S1 to C1)) in various embodiments. In one embodiment, the metadata entries for both directions for a given flow may be stored at the same SMN. Storing both entries at the same node may, for example, help to reduce the number of network messages that are required during the initial creation of the entries and/or to reduce the number of messages that are required to update common flow state information that is to be included for both directions of the traffic flow (such as time-to-live (TTL) settings). In at least some embodiments, respective (different) SMNs may instead be used for each entry of the pair of direction-specific entries corresponding to a given pair of endpoints such as C1 and S1. Such an approach of separating the entries for the two directions may be taken, for example, in scenarios in which the initial SMN at which one of the two entries is created is running low on storage (so the responsibility for storing the second entry is transferred to a different SMN), and/or to increase resilience of stored state metadata for a given flow with respect to potential failures of individual SMNs.

In various embodiments, the DNAT may be responsible for source information substitution—e.g., for replacing the source network address of a given packet with a substitute source address before forwarding the packet to its intended destination, and for replacing the source network port with a substitute port before forwarding the packet. As such, at least some of the elements of the forward-direction 6-tuple egress value and the reverse-direction 6-tuple ingress key may not necessarily be known at the time that the first packet of a given flow in a given direction is received at the DNAT. In some embodiments, a network address associated with an intermediary networking device used for the bi-directional traffic, such as the DNAT appliance itself, may be used as the substitute source address. However, the substitute port may have to be determined at the DNAT SMNs in various embodiments, such that no two flows end up using the same 6-tuple. In at least some embodiments, depending for example on the version of the networking protocol being used, a substitute port number may be set to a non-negative integer value from a range, such as 0 to $2^{16}-1$ as mentioned above. In various embodiments, a technique described below that utilizes a partially-reversible hash function, and takes advantage of the fact that each SMN is already assigned a respective sub-range of flow hash values for which state entries are to be stored, may be used to identify and allocate a substitute port for a given flow at a given SMN. According to the technique, the range of port values for a given 5-tuple of a flow (i.e., a 6-tuple that does not yet have an allocated value for one of the two port elements of the tuple) may be partitioned into roughly equal subsets that are assigned to individual SMNs, and each SMN of the DNAT may allocate so-far-unused ports from that SMN's port subset to individual flows for which port substitution is required. Note that unlike the contiguous flow hash value sub-ranges for which each SMN may be responsible in some embodiments, the subset of ports that an SMN is responsible for may not necessarily be contiguous in such embodiments.

According to at least some embodiments, a system may include a distributed network address translation appliance comprising a plurality of computing devices. The computing devices may include instructions that upon execution on or across one or more processors cause the distributed network address translation (DNAT) appliance to determine that one or more flow state metadata entries corresponding to a first packet received from a traffic origin are to be generated. In response to such a determination, the first packet may be directed to a particular node of a plurality of state manager nodes (SMNs) of the appliance. Individual ones of the SMNs may be configured to store flow state metadata associated with network flows corresponding to a respective flow hash value range in various embodiments. The particular SMN to which the first packet is directed may be selected (e.g., at a node of a layer other than the state management layer of the appliance) at random from the plurality of state manager nodes in some embodiments.

At the SMN to which the first packet is sent, an incomplete reverse-direction flow tuple corresponding to the first packet may be generated in at least some embodiments. The reverse-direction flow tuple may be incomplete in that the destination port for the reverse direction flow (packets flowing from the intended recipient of the first packet back to the traffic origin) may not yet be known, and may therefore be missing. The destination address of the reverse-direction flow tuple may be set in at least some embodiments to an address of a networking intermediary for the flows to which the first packet belongs, such as an address of the DNAT appliance itself.

To allocate the destination port for the reverse direction, the following approach may be used in at least some embodiments, using the intuition that (a) given that each SMN is already responsible for storing state metadata entries for various flows corresponding to a hash value range, and (b) given the hash value range and a hash function that supports reversibility to at least a limited extent, it may be possible to identify, from that set of state metadata entries, a particular entry whose key corresponds to an as-yet unallocated port number. Generally speaking, a function may be described as reversible if, given its output, the corresponding input which resulted in the output can be determined. A first hash function may be applied to the incomplete reverse-direction flow tuple of the first packet to obtain a first intermediate hash result. An unused port number to be assigned or allocated as the destination port for the reverse-direction flow may then be determined at the SMN in various embodiments, using at least (a) the first intermediate hash result, (b) the particular flow hash value range assigned to the SMN, and (c) a lookup table. The assigned destination port may also be referred to as a substitute port, selected for the flow to which the first packet belongs, in various embodiments. The lookup table, replicas of which may be stored at the SMNs of the appliance as part of the initialization of the appliance, may comprise a plurality of entries in various embodiments, with individual entries indicating a mapping between a port number and a second intermediate hash result. A particular entry may be selected from the lookup table in such embodiments to identify the substitute destination port, such that (a) the second intermediate hash result of the entry, when added (using modulo arithmetic in which numbers "wrap around" if they exceed the maximum permissible flow hash value) to the first intermediate hash result obtained from the incomplete reverse-direction tuple, results in a value that lies within the particular flow hash value range assigned to the SMN, and (b) the port number of the particular entry is not already in use (i.e., has not already been assigned by the SMN to another reverse-direction flow corresponding to the incomplete reverse-direction tuple). The SMN may thus verify, prior to allocating a port number, that the sum of the two intermediate hash results (obtained respectively from the incomplete tuple and from the lookup table entry containing the port number) is within the SMN's assigned flow hash value sub-range. In some embodiments, as mentioned earlier, the key used for storing a flow state metadata entry may be based at least in part on the port numbers of the flow's tuple, so determining whether the port is already in use may simply comprise performing a key-based lookup of the data structure used to store the flow state metadata entries. In some embodiments, individual entries in the lookup table may also or instead include an indication of whether the port is in use for a particular flow. In such embodiments, the SMN may examine such in-use indicators to verify that a given port number is not yet in use, and modify the in-use indicators of the selected entry after the port number has been allocated.

The unused port number from the selected particular entry of the lookup table may be assigned or allocated to the previously-incomplete reverse-direction flow tuple at the SMN, thus completing the reverse-direction flow tuple in such embodiments. The substitute destination port of the reverse-direction flow may also be used as the substitute source port for the forward-direction flow in various embodiments. The hashing technique used to identify unused port numbers may be referred to as a partially-reversible hashing algorithm because while the first intermediary hash result may be obtained via an irreversible hash function (where the input to a hash function cannot be identified from the result obtained from the input), the second intermediary hash result may be reversible (i.e., it may be possible, e.g., by simply scanning a sorted version of the lookup table, to determine both the port number corresponding to a given lookup table-based intermediary hash result, and the lookup table's intermediary hash result corresponding to a given port number). The partially reversible hashing algorithm may also be referred to as a summation-based hashing algorithm in some embodiments, as it involves the summation of intermediary hash results or values.

A reverse-direction flow state metadata entry may be stored in a key-value data store at the SMN where the unused port was identified in some embodiments, using a key generated from a flow tuple comprising the allocated destination port and the intermediary device address as the destination address. A forward-direction flow state metadata entry may be stored at the same SMN, or at a different SMN. The reverse-direction flow state metadata entry may indicate the action to be performed for packets of the reverse-direction flow—e.g., that such packets are to be routed to the traffic origin from which the first packet was received; as such, the reverse-direction entry may be used to route various packets originating at the recipient of the first packet. With respect to the forward-direction flow of the first packet, a second packet (representing a re-written or transformed version of the first packet), indicating the allocated unused port as the source port and the intermediary device address as the source address, may be transmitted to the recipient indicated in the first packet. The reverse-direction flow state metadata entry itself may later be used to route one or more packets originating at such a recipient.

In effect, in various embodiments in which the partially-reversible hashing technique outlined above is used, the state manager nodes may combine the work (and data structures) associated with port allocation and flow state metadata entry generation. The hashing technique may automatically ensure that the port set for which a given SMN is responsible (for a given flow 5-tuple) does not overlap with the port set for which any other SMN is responsible, thus avoiding the need for synchronization among the SMNs with respect to port allocation decisions. Further, by using a single unified flow state metadata entry instead of separate data structures for port allocation and flow state information, considerable savings in memory usage may be obtained in various embodiments. In at least some embodiments, in which the number of SMNs may be increased or lowered dynamically based on workload level changes, the unification of the port allocation and flow state metadata management data structures may also simplify the re-assignment of responsibilities when such SMN count readjustments are performed. As one skilled in the art will appreciate in light of this disclosure, certain embodiments may be capable of achieving various advantages, including some or all of the following: (a) reducing the amount of computing and memory resources that may be required for network address translation relative to some other techniques, in which the functionality of port allocation is logically separated from the management and storage of flow state metadata entries, (b) eliminating requirements for communication among SMNs for port allocation-related synchronization, thus reducing the networking resource requirements for implementing distributed network address translation, and/or (c) increasing the ease of analysis/debugging of network address translation operations.

According to at least some embodiments, a distributed network address translator may be implemented using resources of a multi-layer network function virtualization service (NFVS), which in turn may be part of a suite of network-accessible services of a provider network or cloud computing environment. The NFVS may comprise at least two logical layers: an action implementation layer, and an action decision making layer. The action implementation layer may comprise a plurality of action implementation nodes (AINs) in various embodiments. Upon receiving a given network packet from an endpoint associated with an application to which an action implementation node is assigned, in some embodiments the action implementation node may perform a cache look up (e.g., using some combination of header elements of the packet as the key) to determine the specific packet processing action to be performed, and perform the action if an entry for the action is found in the cache. If an entry indicating the action is not found in the cache, a query for the action may be transmitted to the action decision making layer in various embodiments. At the action decision making layer, in various embodiments a pipeline comprising one or more decision logic implementation nodes (DLINs) may attempt to determine, e.g., with the help of one or more state manager nodes (SMNs), the packet processing action to be implemented for the received packet (and, in at least some cases, for other packets associated with the application, which are to be processed similarly). The specific sequence of DLINs to be used for a particular application may be indicated by a client of the NFVS, e.g., by supplying a pipeline descriptor formatted in a markup or scripting language via a programmatic interface in some embodiments. State information pertaining to the group of packets for which the action is determined, including the substitute source/destination port and/or substitute source/destination addresses for the packets of a particular flow, may be generated and stored for a NAT application at the SMNs and propagated as needed to the DLINs and/or the AINs. In some embodiments, the SMNs may be implemented as a distributed hash table (DHT) ring, and state metadata entries pertaining to a given flow may be replicated at several SMNs of the DHT ring. An indication of the action identified at the decision making layer may be provided to the action implementation node, where a corresponding entry representing the action may be stored in the local cache, and the action may be implemented in various embodiments. As a result of the action, in various embodiments one or more packets corresponding to or derived from the received packet may typically be transmitted to one or more destinations associated with the application, although for some applications the action may simply result in the dropping or discarding of the received packet without transmitting a corresponding packet to a destination.

In at least some embodiments, the lookup tables that are used in the partially-reversible hashing algorithm may be generated during initialization of a distributed network address translator. For example, in one embodiment, if the allowable port numbers used in the network protocol being used for the traffic range between 0 and $2^{16}-1$, a lookup table with $2^{16}$ entries may be generated and replicated at each SMN of the DNAT. If, in such an embodiment, the range of flow hash values is 0 to $2^{32}-1$, and each entry of the lookup table is populated with a different intermediate hash result in the range of flow hash values, a large number of possibilities (e.g., $2^{32}/2^{16}$, or $2^{16}$ possibilities) may be available for the particular intermediate hash result to be stored in a given lookup table entry. In some embodiments, the intermediate hash results stored in the lookup table may be selected as follows: first, a minimum difference between any two intermediate hash results may be computed (e.g., by dividing the allowed flow hash range such as $2^{32}$ by the allowed port range such as $2^{16}$). Then, a set of intermediate hash result values $\{v_i\}$, with the members of the set being separated from one another by an integer multiple of the minimum difference (e.g., multiples of $2^{16}$) may be identified, and assigned in a particular randomized order to the entries of the lookup table. As a result of using such a lookup table generation algorithm, the hash results stored in the table may be distributed fairly uniformly within the flow hash value range. Furthermore, as port numbers increase in the entries of the lookup table, the corresponding intermediate hash result values may not necessarily increase in lock-step with the port numbers—e.g., if one lookup table entry LTE1 has a port number P1 mapped to an intermediate hash result IHR1, and a second lookup table entry LTE2 has a port number P2 (which is greater than P1) mapped to intermediate hash result IHR2, this does not imply that IHR2 will necessarily be greater than IHR1.

In some embodiments, the flow state metadata entries generated and stored at the SMNs used for a DNAT appliance may comprise several different kinds of information, e.g., in addition to a representation of the address translation action to be performed. For example, metrics collected for the flow, time-to-live settings for the entry indicating how long the entry is to be retained before the entry is either discarded or refreshed, and so on, may be stored in a metadata entry. In at least some embodiments, a given flow state metadata entry may be replicated at several different SMNs for durability and availability, with one SMN being designated as the primary replicator of the entry, another SMN designated as the secondary, and so on.

Example System Environment

FIG. 1 illustrates an example system environment in which a partially-reversible hashing algorithm may be employed for port allocation at a distributed network address translator appliance, according to at least some embodiments. As shown, system 100 may include various resources of a distributed network address translator appliance 102 used for network packets flowing between two sets of endpoints: a traffic origin (TO) set 110, and a traffic destination set 190. Note that the endpoints are designated as "origins" versus "destinations" arbitrarily in the depicted embodiment, simply to illustrate the roles of the endpoints with respect to a particular direction of traffic. As such, a given traffic destination TD (such as TD 192A or TD 192B) may serve as a traffic origin for packets flowing in the reverse direction with respect to the designated TOs 112A and 112B, and a given traffic origin TO (such as TO 112A or TO 112B) may represent a traffic destination for packets flowing in the reverse direction.

In the depicted embodiment, an O-to-D packet 160 (i.e., a packet originating at TO set 110, to be directed to a TD within TD set 192) may be received initially at an action implementation node (AIN) 121, such as 121A or 121B, of an action implementation layer 120 at the DNAT appliance 102. The particular AIN 121 to which the packet 160 is directed may be selected, e.g., based on a 6-tuple (traffic origin network address, traffic origin node, traffic destination network address, traffic destination port, network protocol, and DNAT appliance identifier) in the depicted embodiment. The DNAT may be responsible for source information substitution—that is, in a transformed version 162 of the O-to-D packet, the source address and source port that were indicated in the original O-to-D packet may be replaced by a substitute source network address and a substitute source port number. For traffic in the reverse direction (D-to-O), the corresponding reverse translations may be performed at the DNAT appliance 102 in the depicted embodiment—that is, the destination address and port indicated in an original D-to-O packet 164 may be replaced in the transformed version 166 with a substitute destination address and destination port (e.g., the source address and the source port of the original O-to-D packet to which the D-to-O packet represents a response). Note that in some embodiments, more complex address translations may be performed—e.g., source information substitutions (and corresponding destination information substitutions for the reverse direction) may be made for both sets of endpoints (TOs as well as TDs), and not just for the endpoints designated as TOs 112 in FIG. 1.

The AINs 121 may each maintain a cache representing address translation actions, e.g., in executable form such as programs expressed using eBPF (the extended Berkeley Packet Filter framework) that have already been formulated at the state management layer 130 of the DNAT appliance 102 in the depicted embodiment. If the AIN 121 that received a O-to-D packet 160 finds an applicable action in its cache (e.g., using a 6-tuple flow hash value of the received packet as a key), it may apply the action to the received packet, resulting in the transmission of a transformed O-to-D packet to the intended recipient TD 192 in the depicted embodiment. If the AIN does not find an applicable action in its cache, it may send a request for an action to a selected state manager node (SMN) 131, e.g., SMN 131A or 131B of state management layer 130 in the depicted embodiment. In some embodiments, an SMN may be selected at random by the AIN (or by a node at another layer of the DNAT appliance 102 that serves as an intermediary between the AINs and the SMNs, and is not shown in FIG. 1). In other embodiments, the SMN 131 may be selected based on one or more properties of the received packet.

The SMN 131 may determine whether it has already created a flow state metadata entry for the received packet's flow in the depicted embodiment. If such an entry has already been created and stored in the SMN's flow state entry collection 133 (e.g., 133A or 133B), the SMN may transmit a representation of the address translation action to be performed, which is indicated in the entry, to the requesting AIN for implementation. If, in contrast, no such entry is present in the collection 133, the SMN may generate at least one flow state metadata entry corresponding to the received packet in the depicted embodiment, store the generated entry in its collection 133, and provide an indication of the address translation action indicated in the generated entry to the AIN for implementation. In various embodiments, a partially-reversible hashing (PRH) algorithm 150, in which one or more hash functions and a lookup table replica 132 (e.g., 132A or 132B) may be used to determine and allocate a substitute port for the flows associated with the received packet, and the substitute port may be included in at least some of the flow state metadata entries generated for the received packet.

Individual ones of the SMNs 131 may each be configured to store flow hash entries for a respective sub-range of flow hash values in the depicted embodiment. According to the PRH algorithm, a 5-tuple for a flow associated with the received O-to-D packet (e.g., for the reverse-direction flow corresponding to the received O-to-D packet) may first be constructed, with a substituted destination network address for the reverse-direction flow being set to a network address of an intermediary networking device such as the DNAT appliance itself. Note that the source address and port for the reverse direction, as well as the DNAT appliance identifier and the networking protocol, may already be known, so the only missing element of the complete 6-tuple that would normally be used for reverse-direction flow hashing of the packet is the (substitute) destination port. A first intermediate hash value may be generated at the SMN by applying a hash function to the 5-tuple (a tuple that is incomplete in the sense that one of the port numbers of the flow identifier 6-tuple is yet to be determined), and then an entry of the lookup table replica 132 of the SMN may be selected to obtain a second intermediate hash value and an unused port number that is to be employed as the substitute port number. Individual entries of the lookup table replicas may contain mappings of port numbers to additional intermediate flow hash values. If the first intermediate hash value obtained from the 5-tuple is IHV1, in various embodiments, an entry (Pk, IHV2) may be selected at the SMN 131 from its lookup table replica 133 such that (a) (IHV1+IHV2) lies within the flow hash value sub-range assigned to the SMN 131 and (b) the port number Pk has not been assigned to some other flow for the same 5-tuple. If such an entry can be found in the lookup table replica 133, the unused port number Pk may be assigned as the substitute port number to be used to convert the 5-tuple (with the hitherto missing port number) to a 6-tuple. Once the 6-tuple has been populated, all the information needed to generate forward and reverse direction flow state metadata entries corresponding to the received packet may be available, and such entries may be created and stored at the storage management layer. In some embodiments, the SMNs 131 may be implemented as members of a distributed hash table ring. In at least some embodiments, each state metadata entry may be replicated at two or more SMNs. Note that although the completion of a 6-tuple (starting from a 5-tuple), by identifying an unallocated port number using the PRH algorithm has been described above, similar techniques may be used with equal success to complete a 5-tuple (starting from a 4-tuple) in an embodiment in which the DNAT identifier is not included in the tuples used to distinguish among packet flows.

After the unused port has been allocated as the substitute port, and the corresponding flow state metadata entries have been generated and stored, in at least some embodiments a representation of the address translation action for the received O-to-D packet may be provided to the AIN 121 from which a request was received at the SMN 131. The representation of the action may be cached at the AIN 121, and a transformed O-to-D packet 162 may be transmitted to a traffic destination from the AIN 121. For packets 164 sent in the reverse direction, the flow state metadata entry may already have been created, and the actions indicated in the flow state metadata entry may be implemented at an AIN 121, resulting in the transmission of transformed O-to-D packets 166 with the appropriate translated destination information. In an original O-to-D packet 164, the destination port may be the port number than was allocated using the PRH algorithm, and the destination address may be the address of the networking intermediary which was used as the substitute source address in the transformed D-to-O packet. In the transformed D-to-O packet 166, the destination address may be set to the address of the TO 112 from which the O-to-D packet was received, and the destination port may be set to the pre-substitution source port of the O-to-D packet.

Example Address Substitutions

Figure 2:
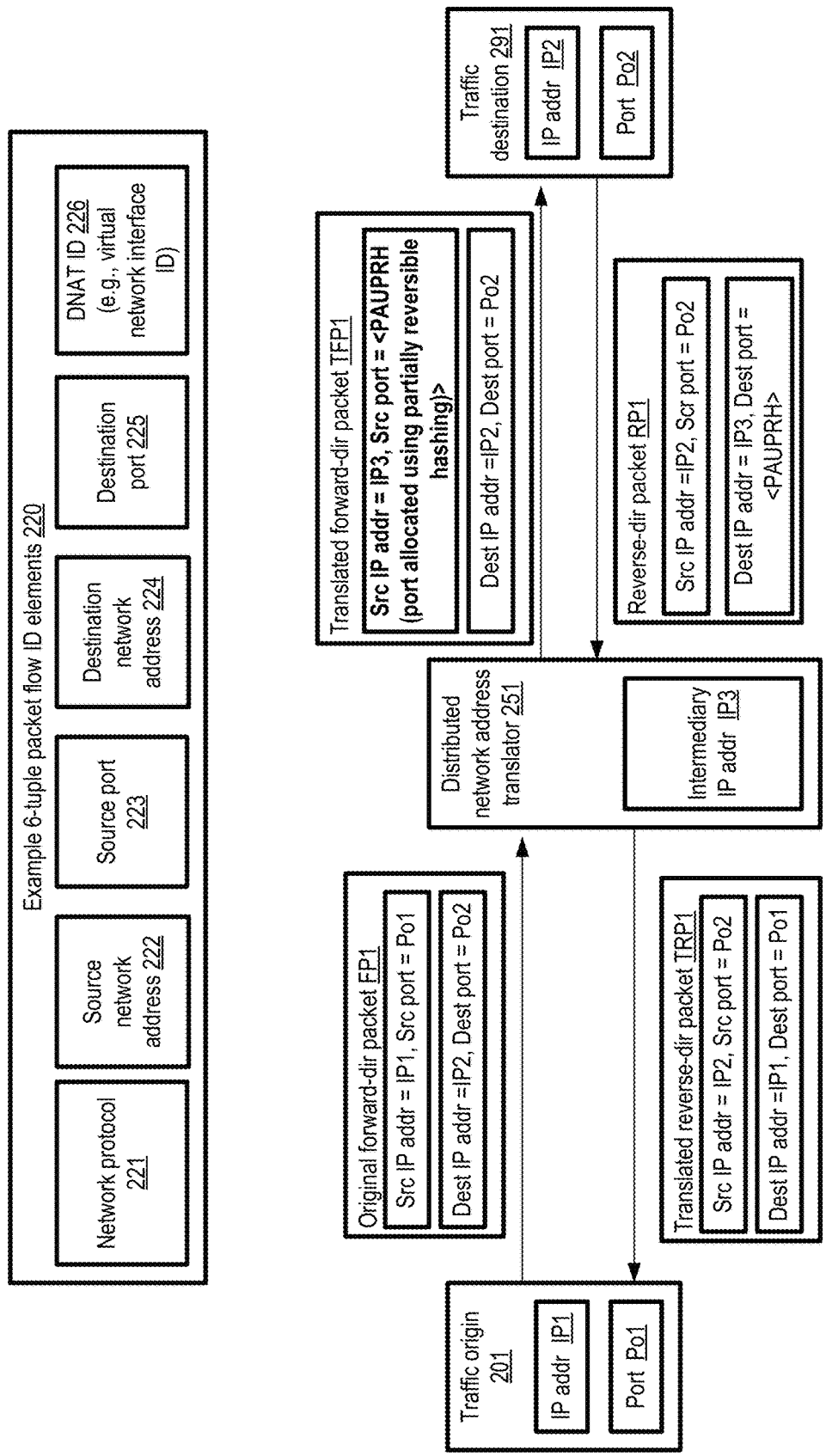
FIG. 2 illustrates an example of the kind of source address information substitution operations that may be performed at a distributed network address translator, according to at least some embodiments.

FIG. 2 illustrates an example of the kind of source address information substitution operations that may be performed at a distributed network address translator, according to at least some embodiments. Packet flow identifiers may be generated from a 6-tuple of packet property elements 220 in the depicted embodiment: the network protocol 221, the source network address 222, the source port 223, the destination network address 224, the destination port 225, and an identifier 226 of the distributed network address translator appliance itself (such as an identifier of a virtual network interface assigned to the DNAT appliance). A hash function may be applied to elements 220, for example, and the integer output of the hash function (e.g., a value between 0 and $2^{32}-1$ or between 0 and $2^{64}-1$) may be used as the flow identifier. Various data structures at the distributed network address translator or appliance 251 may be indexed using such flow identifiers as keys.

In the depicted embodiment, source address information substitution may be performed for packets flowing from traffic origins 201 to traffic destinations 291. The "forward" direction of traffic is assumed to be from traffic origin 201 to traffic destination 291, and the "reverse" direction traffic is assumed to comprise packets flowing from traffic destination 291 to traffic origin 201. Four of the six elements 220 are shown for packets flowing between the traffic origin 201, the DNAT 251, and the traffic destination 291; the DNAT ID and the network protocol, which remain unchanged for all the packets of a given flow, are not shown.

The traffic origin 201 may have an IP address IP1 and a port Po1 (e.g., a TCP port) from which a connection is established with IP address Ip2 and port Po2 of traffic destination 291. An original forward-direction packet FP1, with a source IP (Internet Protocol) address IP1, may be received at the DNAT 251 from the traffic origin 201, with source address IP1, source port Po1, destination address IP2, and destination port Po2. The DNAT may be responsible for substituting the source address and port information in the translated forward-direction packet TFP1 in the depicted embodiment. Such substitutions may be performed for any of a variety of reasons in different applications—e.g., because the IP address IP1 is a "private" address which is not advertised outside an isolated network in which traffic origin 201 is configured, because the DNAT 252 is acting as a common bi-directional intermediary for numerous traffic origins with different IP addresses, and so on. In TFP1, the original source IP address IP1 may be replaced by a substitute source address IP3 (e.g., an IP address assigned to the DNAT itself), and the original source port Po1 may be replaced by a substitute port PAUPRH (a port allocated using a partially reversible hashing algorithm of the kind discussed above). A reverse-direction packet RP1, with source address IP2, source port Po2, destination address IP3, and destination port PAUPRH may be received at the DNAT 251 in the depicted embodiment. A corresponding translated reverse-direction packet TRP1 may be generated at the DNAT and sent to the traffic origin, with source address IP2, source port Po2, (substituted) destination address IP1, and (substituted) destination port Po1. The flow state metadata entries generated at the DNAT 251 using the partially-reversible hashing algorithm may be used to perform the kinds of address translations shown in FIG. 2, as well as more complex translations (in which for example the source information for both origins and destinations is translated) in various embodiments.

Example Partially-Reversible Hashing Algorithm Used for Port Allocation

Figure 3:
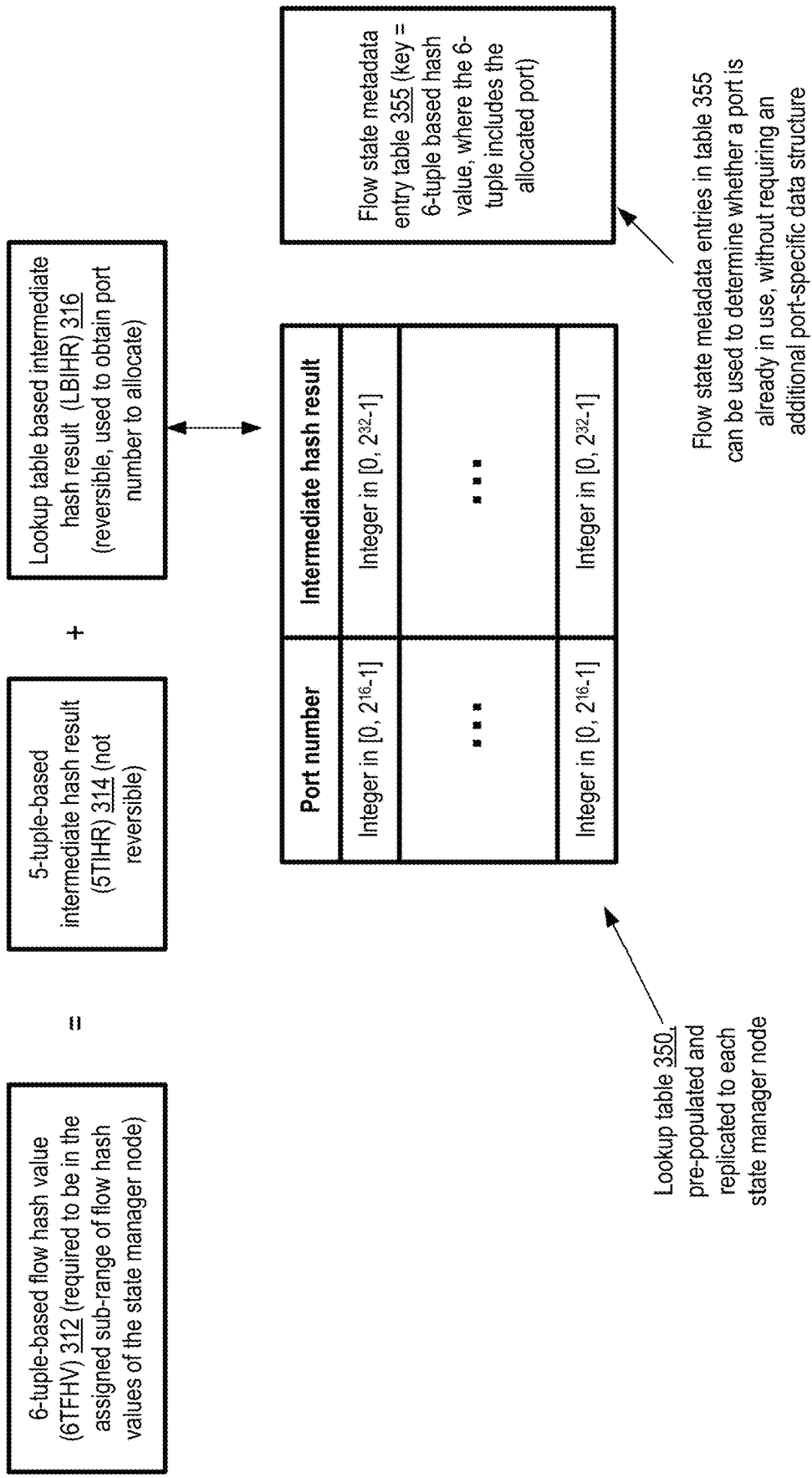
FIG. 3 illustrates an overview of a partially-reversible hashing algorithm that may be used for port allocation at a distributed network address translator, according to at least some embodiments.

FIG. 3 illustrates an overview of a partially-reversible hashing algorithm that may be used for port allocation at a distributed network address translator, according to at least some embodiments. According to the example partially-reversible hashing algorithm 302, a 6-tuple-based flow hash value (6TFHV) 312 for a particular packet flow may be obtained by adding two terms: a 5-tuple based intermediate hash result (5TIHR) 314, and a lookup table based intermediate hash result 316.

At the point in time that a state manager node (SMN) of a distributed network address translator (DNAT) has to select and allocate a substitute port number for a particular packet flow, the algorithm 302 assumes that the remaining elements of the 6-tuple (including a substitute network address) are known at the SMN. For example, as discussed earlier, in at least some embodiments a particular SMN, SMN1, may be selected from among the configured SMNs of the DNAT to generate and store a reverse-direction flow state metadata entry for a packet P1 to be transmitted in the forward direction (from a traffic origin to a traffic destination). With respect to the reverse direction, the source network address and port number may be known at SMN1, the (substitute) destination network address may be set to an intermediary device address (such as an address of the DNAT itself), and the network protocol and DNAT identifier may also be known at SMN1; the destination port may be the only missing element of the 6-tuple.

The assigned sub-range ASR1 of flow hash values of SMN1 may also be known in various embodiments at SMN1, as well as a lookup table 350. Lookup table 350 may comprise a plurality of entries in the depicted embodiment, with individual entries indicating a respective pre-generated mapping between a port number (e.g., an integer in an allowable port range 0 to $2^{16}-1$) and an intermediate hash result (IHR) usable as the LBIHR (e.g., an integer in the allowable flow hash value range 0 to $2^{32}-1$). In various embodiments, the lookup table mappings may be replicated at all the SMNs of the DNAT, e.g., during the initialization phase of each of the SMNs.

The reverse-direction 6TFHV for P1 may be required to lie within ASR1 in the depicted embodiment. SMN1 may apply one or more hash functions to the known 5-tuple for the reverse-direction to obtain the 5TIHR. Then, it may examine the entries of lookup table 350 to find an entry E1 such that (a) the sum E1's IHR and the 5TIHR lies within ASR1 and (b) the port number of E1 is not currently in use for the 5TIHR. In at least some embodiments, the flow state metadata entries that have earlier been generated at the SMN may be stored as a key-value table 355, with the keys being based on the 6-tuple hash values for the flows. As a result, to determine whether a given port number of a lookup table entry is already in use, the corresponding 6-tuple key (obtained by adding the intermediate hash result of the entry and the 5TIHR) may be used to query the table 355. If a state metadata entry for the key already exists, this may indicate that the port corresponding to the lookup table entry is already in use; otherwise, the port may be free and may therefore be allocated as the substitute port. As a result, a separate port-specific data structure may not be required in such embodiments.

In some embodiments, other techniques for determining whether a given port is in use for a given 5TIHR may be used. For example, in one embodiment, corresponding to each port-IHR mapping of the lookup table, a local ports in-use table may be maintained, indicating, for a given port number, the 5TIHRs (if any) for which that port number has already been allocated. Such a ports-in-use table may be used to identify a port number that is not currently in use. Other types of data structures may be used to store information regarding the ports that have already been allocated in some embodiments.

Having found an entry E1 that meets the requirements of an unused port and the constraints on the summed hash value 6TFHV of algorithm 302, E1's port may be allocated as the substitute port (e.g., the substitute reverse-direction destination port, which is also the same as the substitute forward-direction source port) in the depicted embodiment. After all 6 elements of the 6-tuple have thus been determined, both the reverse-direction and the forward-direction flow state metadata entries may be created, and if needed, the appropriate executable address translation actions may be provided to action implementation nodes in some embodiments from the SMNs at which the state metadata entries are stored.

Figure 4:
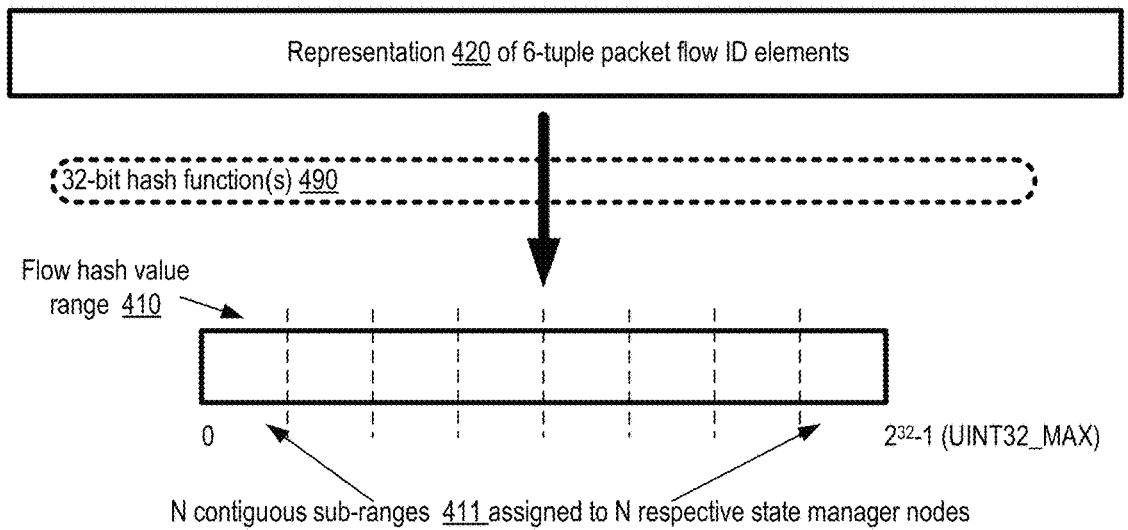
FIG. 4 illustrates example distributions of flow hash ranges and port numbers among state manager nodes of a distributed network address translator, according to at least some embodiments.
Figure 4:
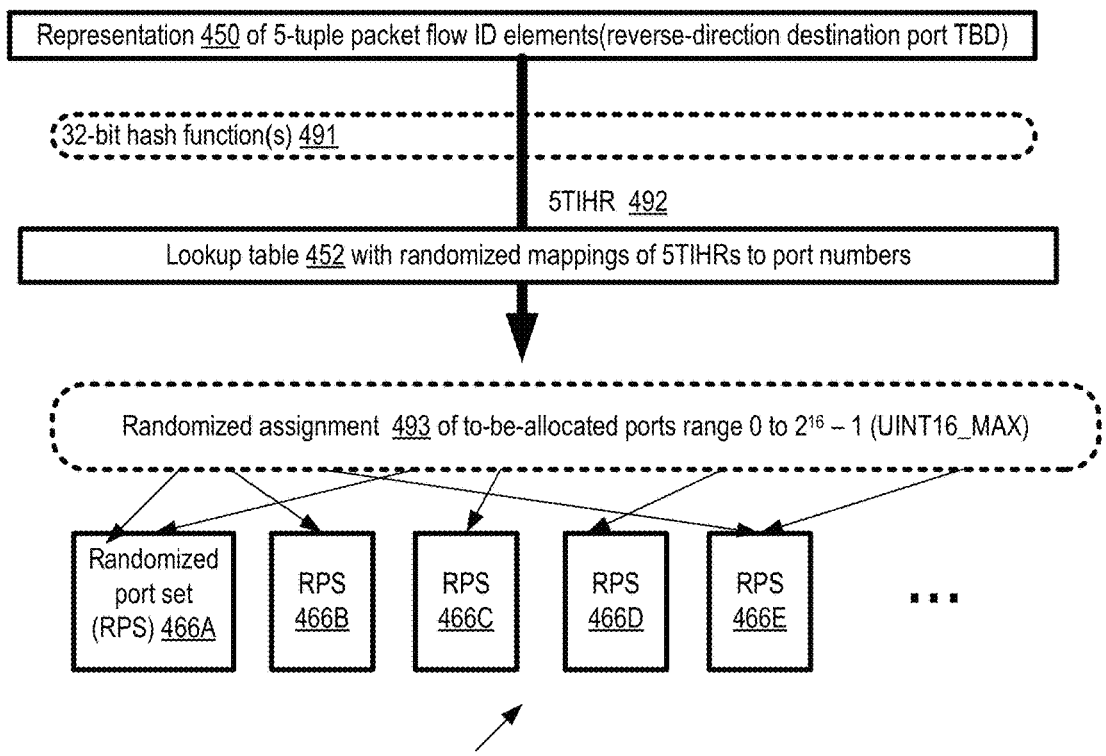

Example Distribution of Flow Hash Values and Port Values Among State Manager Nodes In various embodiments, the workload of state management and port allocation may be distributed (approximately) uniformly among the plurality of state manager nodes of a distributed network address translator. FIG. 4 illustrates example distributions of flow hash ranges and port numbers among state manager nodes of a distributed network address translator, according to at least some embodiments. In the depicted embodiment, flow hash values are assumed to be 32-bit unsigned integers (integers between 0 and $2^{32}-1$), and port numbers are assumed to be 16-bit unsigned integers (integers between 0 and $2^{16}-1$). $2^{32}-1$ may also be referred to in various programming languages as UINT32_MAX, indicating that it is the largest 32-bit unsigned integer; similarly, $2^{16}-1$ may be referred to in various programming languages as UINT16_MAX, indicating that it is the largest 16-bit unsigned integer.

According to flow hash SMN assignment algorithm 401, a representation 420 of 6-tuple packet flow identifier elements of a given packet may be generated, e.g., by concatenating binary representations (bit sequences) representing each of the six elements. One or more 32-bit hash functions 490 may be applied to representation 420, obtaining a 32-bit integer that lies in the flow hash value range 410 of 0 to UINT32_MAX. In an embodiment in which N state manager nodes (SMNs) are configured, the range 410 may divided into N contiguous sub-ranges 411, with each sub-range assigned to a respective state manager node. For example, contiguous hash values (0 to H1) may be assigned to SMN0, contiguous hash values ((H1+1) to H2) may be assigned to SMN1, and so on. In some embodiments, at least initially, the sub-ranges 411 assigned to individual SMNs may be approximately equal in size. However, portions of the sub-ranges may be re-assigned (e.g., to additional SMNs configured for the DNAT) in some embodiments, resulting in at least temporary imbalance in the sizes of the sub-ranges assigned to individual SMNs.

For a given 5-tuple packet flow identifier element combination, the range of port numbers that can be allocated may be distributed among N SMNs as follows according to port set SMN assignment algorithm 481. A representation 450 of the 5-tuple packet flow identifier elements (e.g., with the reverse-direction destination port to be determined) may be generated, and one or more 32-bit hash functions 491 may be applied to the representation to obtain a 5TIHR 492 in the depicted embodiment. The 5TIHR 492, along with the known sub-range of flow hash values assigned to the SMN at which the port is to be determined, may be used to look up an entry indicating an unused port number in lookup table 452. In the lookup table, the intermediate hash result (IHR) to which a given port number is mapped may be determined using a random selection algorithm in at least some embodiments. For example, in one embodiment, assume that K (e.g., $2^{16}$) port number-to-IHR mappings are to be included in the lookup table 452. K IHRs in the overall range (0 to UINT32_MAX) may be selected, and assigned randomly to the K entries in such an embodiment. In some embodiments, the K IHRs may be distributed uniformly or near-uniformly in the IHR range (0 to UINT32_MAX), e.g., by dividing the range by K to compute a minimum difference between any two IHRs and ensuring that all the selected IHRs differ from other selected IHRs by some multiple of the computed minimum difference. In embodiments in which the mappings of the lookup table are randomized, the use of the partially-reversible hashing (PRH) technique described above may result in the randomized assignment 493 of port sets 466 (e.g., 466A-466E) in the allowed port range (0 to UNIT16_MAX) to individual ones of the SMNs. For a given 5-tuple, the use of the PRH algorithm in combination with randomized lookup tables may result in a deterministic assignment of N approximately equal-sized sets 481 of port numbers to N respective SMNs in the depicted embodiment. For example, for a given 5-tuple, the set of port numbers 466A that SMN0 may allocate as a substitute port number may include (232, 1299, 6514, . . . ), the set 466B that SMN1 may allocate may include (5555, 3331, 6751, . . . ), and so on. The randomized algorithm may be useful in various embodiments because some traffic sources and/or destinations may typically assign ports in sequential order, which may lead to imbalanced workloads among the SMNs if randomization is not employed at the DNAT.

Example Limits for Lookup Table Intermediate Hash Results

Figure 5:
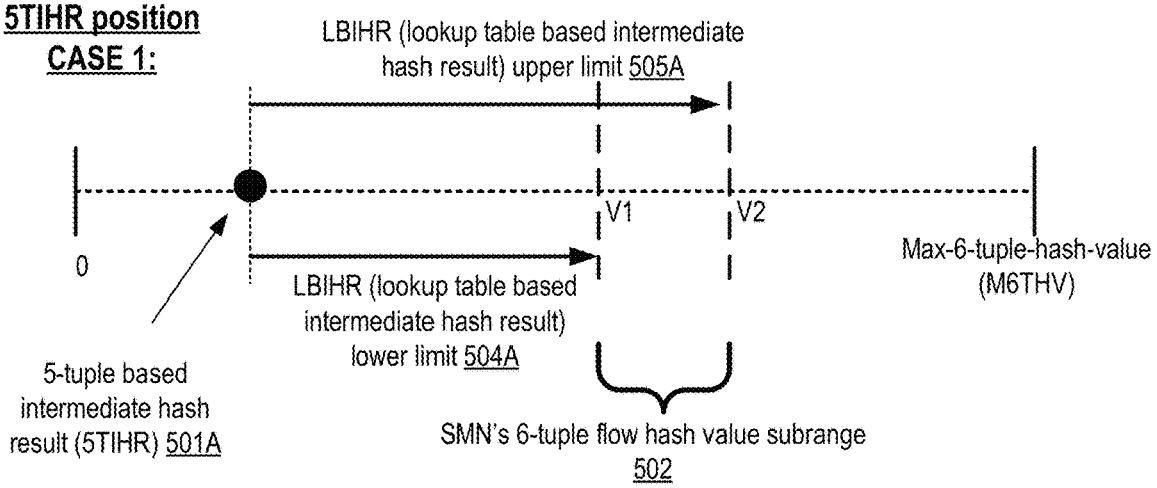
FIG. 5 illustrates examples of determining lower and upper limits for lookup table based intermediate hash results that may be used for identifying ports to be allocated to packet flows, according to at least some embodiments.
Figure 5:
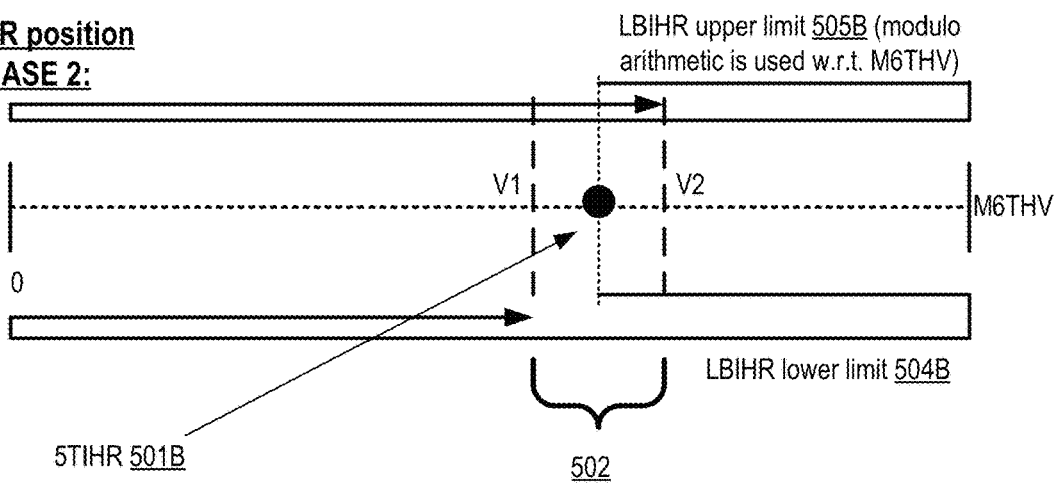
Figure 5:
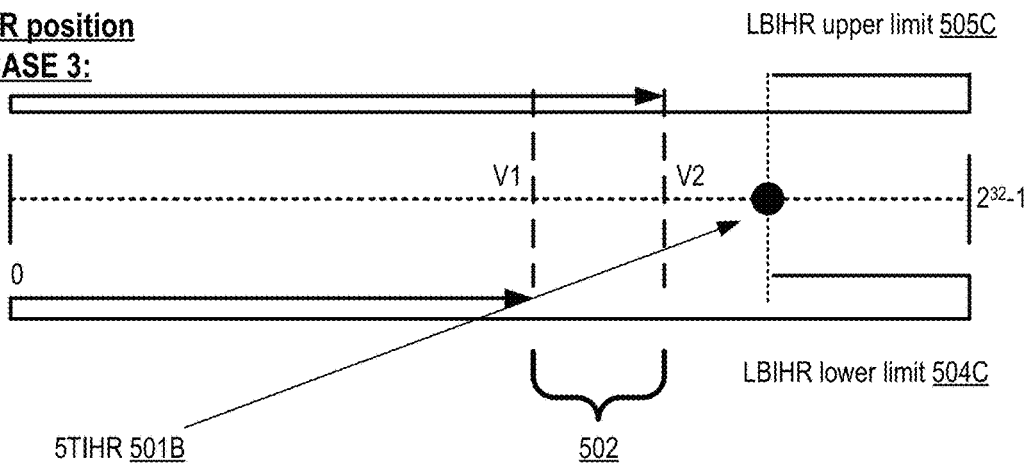

As described earlier, in various embodiments, the sub-ranges of flow hash values that are assigned to individual SMNs may be used, along with the 5-tuple based intermediate hash results (5TIHRs), to identify the set of lookup table entries from which an unused port can be determined. FIG. 5 illustrates examples of determining lower and upper limits for lookup table based intermediate hash results that may be used for identifying ports to be allocated to packet flows, according to at least some embodiments. In each of the three cases (5TIHR position Cases 1, 2 and 3), an assigned 6-tuple flow hash value sub-range 502 from V1 to V2 along an allowed flow hash value range of 0 to Max-6-tuple-hash-value (M6THV) is assigned to the particular state manager node (SMN) at which the port is to be allocated. In some embodiments, M6THV may be UINT32_MAX, as discussed earlier.

As part of the computations of a partially-reversible hashing (PRH) algorithm similar to that discussed earlier (e.g., in the context of FIG. 3), a 5-tuple intermediate hash result (5TIHR) may be obtained. In 5TIHR case 1 of FIG. 5, the obtained 5TIHR happens to be smaller than V1, and is therefore positioned to the left of V1 on the line representing the range 0 to M6THV. In 5TIHR case 2, the obtained 5TIHR happens to be greater than V1 and smaller than V2, and is therefore positioned between V1 and V2. In 5TIHR case 3, the obtained 5TIHR happens to be greater than V2, and is therefore positioned to the right of V2.

In each of the three cases shown in FIG. 5, a lookup table based intermediate hash result LBIHR which meets two conditions has to be found at the SMN in various embodiments. According to the first condition, the sum of the 5TIHR and the LBIHR must lie between V1 and V2 (note that modulo arithmetic with respect to M6THV may be used when computing the sum, so that the sum result "wraps around" M6THV and never exceeds M6THV). According to the second condition, the LBIHR must be mapped to a port number that is currently not in use.

The lower bound and upper bound on the intermediate hash values that satisfy the first condition are illustrated in FIG. 5 for the three cases of relative positioning of the 5TIHR with respect to V1 and V2. In case 1, those lookup table entries whose intermediate hash result values lie between LBIHR lower limit 504A and upper limit 505A may be identified as candidates for selecting a port number to be allocated, because by adding such an entry's intermediate hash result to 5TIHR 501A, a 6-tuple hash value in the acceptable V1-to-V2 range may be obtained. The difference between the LBIHR lower limit and the LBIHR upper limit is (V2–V1). Among the lookup table entries whose hash results lie between the computed limits 504A and 505A, one that has a port number which is not already in use for the 5TIHR 501 may be selected (to satisfy the second condition mentioned above), and that port number may be allocated in the depicted embodiment as a substitute port as discussed earlier.

In case 2, when the 5TIHR already lies between V1 and V2, the LBIHR lower limit 504B may be obtained by wrapping around the M6THV value as shown, and the LBIHR upper limit 505B may once again be obtained by adding (V2–V1) to the LBIHR lower limit. In effect, when modulo arithmetic is used during addition, "wrapping around" M6THV may be equivalent to subtracting the complement of the addend with respect to M6THV in various embodiments. Thus, for example, in case 2, adding an LBIHR Vx that lies between 504B and 501B to the 5TIHR 501B, modulo M6THV, is logically equivalent to subtracting (501B–Vx) from 501B. In case 3, when the 5TIHR exceeds V2, the LBIHR lower limit 504C may also be obtained by wrapping around the M6THV value as shown, and the LBIHR upper limit 505C may again be obtained by adding (V2–V1) to the LBIHR lower limit.

Example Network Function Virtualization Service for Distributed NAT

Figure 6:
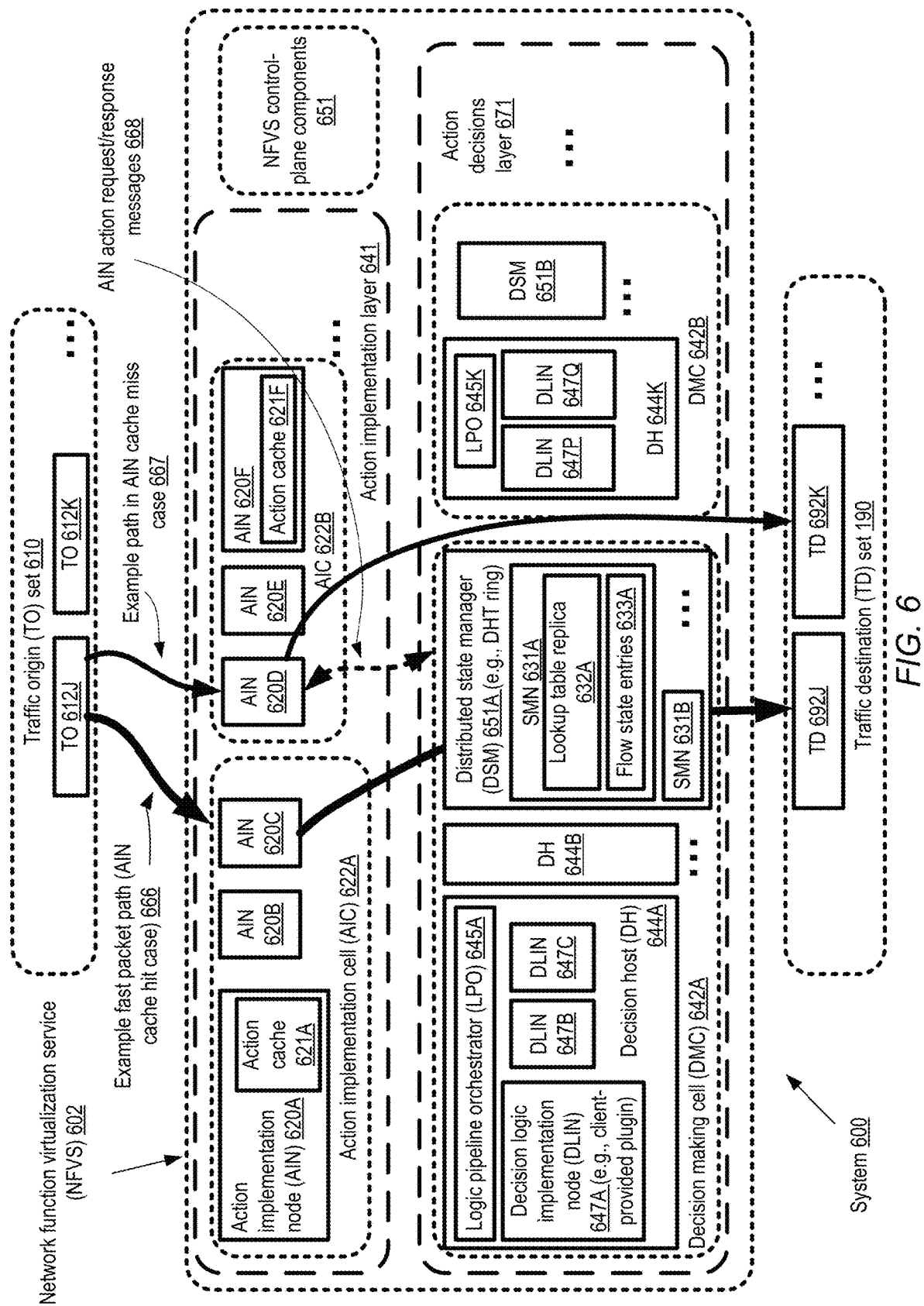
FIG. 6 illustrates an example system environment in which a network function virtualization service may be employed for distributed network address translation, according to at least some embodiments.

FIG. 6 illustrates an example system environment in which a network function virtualization service may be employed for distributed network address translation, according to at least some embodiments. As shown, system 600 comprises resources and artifacts of a multi-layer network function virtualization service (NFVS) 602, including nodes arranged within cells of an action implementation layer 641 and an action decisions layer 671. In various embodiments clients of such a service may be able to deploy various combinations a diverse collection of customized packet processing actions suited for their applications (including, but not necessarily limited to, actions that implement distributed network address translation of the kind discussed above), without for example having to be concerned about infrastructure management tasks such as scaling up the resources needed, managing failure events at resources being used for packet processing, and the like. The networking functionality implemented using such actions may be described as being "virtualized", and the service may be termed a network function "virtualization" service, because the clients may not have to manage the physical resources needed for the applications.

The elements of the action implementation layer 641 and the action decisions layer 671 may be considered part of the data plane of the NFVS 602 in various embodiments, as they may be used collectively primarily for processing application data packets of various NFVS clients. In addition to the data plane, the NFVS 602 may comprise a set of control plane components 651, which may be used primarily for configuration and administration of the service in the depicted embodiment. For example, in various embodiments, clients of the NFVS may submit programmatic requests to the control plane 651 as discussed below, requesting that connectivity via the NFVS data plane be established between specified groups of endpoints for one or more applications, providing configuration details of the packet processing tasks (including NAT tasks) to be performed, and so on.

The NFVS 602 may be used to process network traffic flowing in one or both directions between numerous endpoint sets in different embodiments. In the embodiment shown in FIG. 6, network packets associated with one or more applications of one or more NFVS clients are assumed to be received at the action implementation layer 641 from endpoints of traffic origin (TO) set 610, such as TO 612J or 612K. After the appropriate packet processing actions are performed with regard to a given received packet, one or more outbound packets may be transmitted from the NFVS 602 to endpoints at a traffic destination (TD) set 690, such as TD 692J or 692K. For example, in one embodiment, the TO set 610 may represent clients of a network-accessible service PNS1 being implemented using resources of a provider network, the TD set 690 may represent servers of the service PNS1, and the packet processing tasks being performed may include distributed network address translation, load balancing, or the like.

In the depicted embodiment, the action implementation layer 641 and the decisions layer 671 may each comprise a respective collection of cells. In various embodiments, an action implementation cell (AIC) 622 (such as AIC 622A or 622B) may be considered an easily replicable unit of packet processing capacity, while a decision making cell (DMC) 642 (such as DMC 642A or 642B) may be considered an easily replicable unit of decision making capacity with respect to identifying specific actions to be implemented for various groups or flows of packets. A given client application which requires packet processing to be performed for traffic flowing between a pair of endpoint sets may initially be assigned some number of AICs 622 and some number of DMCs 642 in the depicted embodiment, with the specific numbers of AICs and DMCs being selected at the NFVS control plane based for example of estimates of the traffic volume to be processed for the application. Later, based for example on metrics collected from the nodes of the assigned AICs and DMCs, the numbers of AICs and/or DMCs may be dynamically increased or decreased, without interrupting the application's traffic in various embodiments.

In the depicted embodiment, an action implementation cell 622 may comprise one or more action implementation nodes (AINs) 620, such as AIN 620A, 620B, 620C, 620D, 620E or 620F, and at least one action cache 621, such as cache 621A or 621F. In some embodiments, individual ones of the AINs 620 may have respective action caches 621. A given action implementation node 620 may comprise software and/or hardware elements at one or more computing devices such as physical hosts in various embodiments. When a packet is received at a given AIN 620, an attempt may be made to look up a corresponding packet processing action in a locally accessible cache (such as cache 621A in the case of AIN 620A). A key comprising, for example, some combination of header element contents of the incoming packet and/or other characteristics of the incoming packet may be used to look up the action in the cache in some embodiments. If an action corresponding to the received packet is found in the cache 621, the action may be implemented at the AIN, and as a result, one or more outbound packets corresponding to the received packet may be transmitted to one or more destinations (e.g., one of the TDs 692) in the depicted embodiment. (Note that some actions may simply result in dropping the received packet, without transmitting any corresponding packets towards a destination.) This scenario, corresponding to an AIN cache hit, is represented by the pathway labeled 666 in FIG. 6. In at least some embodiments, individual actions may be identified for a group of packets to which the received packet belongs, where the group may be referred to as a "flow", and groups may be distinguished from other groups by some combination of packet header elements (such as the 6-tuples discussed above). In various embodiments, the cache hit rate at the AINs may be expected to be quite high, and the most common scenario for packet processing may thus require no interactions with the action decisions layer 671. The path between a traffic origin 612, an AIN 620 at which the cache hit occurs, and a traffic destination 692 may represent a "fast path" for packet processing and transmission in the depicted embodiment. In at least some embodiments, one or more customized executable programs for implementing the packet processing actions required for a given application whose traffic is to flow between a pair of endpoint sets may be supplied to the NFVS and deployed at resources designated for AINs 620.

If an action for a given received packet is not found in a cache 621, an AIN 620 may interact with a decision making cell (DMC) 642 at the action decisions layer 671 to determine how the packet should be processed. As indicated by arrow 668, one or more action request and response messages may be exchanged between the AIN and a DMC to identify the action to be performed. In the general case, a given DMC 642, such as 642A or 642B may comprise one or more logic pipeline or path orchestrators (LPOs) 645 (e.g., LPO 645A or 645K), a pipeline of one or more decision logic implementation nodes (DLINs) 647 (such as 647A, 647B, 647C, 647P, or 147Q), and a distributed state manager (DSM) 651 (such as DSM 651A or 651B) in the depicted embodiment. A distributed state manager 651 may comprise a plurality of state manager nodes 631, such as SMNs 631A and 631B, which may for example utilize the partially-reversible hashing algorithm described above for port allocation as part of a network address translation application in some embodiments. In such an embodiment, a given SMN such as SMN may comprise a lookup table replica 632A and a collection of flow state metadata entries 633A, similar to the lookup tables and state metadata entries discussed earlier (e.g., in the context of FIG. 1). In some embodiments, a DMC 642 may comprise one or more decision hosts (DHs) 644, such as DH 644A and 644B of DMC 642A, or DH 644K of DMC 642B. In such an embodiment, a given DH may include one or more LPOs 645 and one or more DLINs 647. In at least one embodiment, a given DMC 642 may also include one or more action caches.

When a request for an action to be identified for a given packet is received from an AIN 620 at a DMC 642, in some embodiments the LPO may attempt to determine whether an action for that packet was already generated earlier. If so, the action may be retrieved from an action repository or cache (not shown in FIG. 6) accessible from the DMC and returned to the requesting AIN 620 for implementation in some embodiments. The AIN 620 may receive a representation of the action, store it in its cache 621, and implement the action, resulting in one or more packets being transmitted to a destination as indicated in the cache miss path 667 (or resulting in a received packet being dropped). In at least one embodiment, the packet processing action may be implemented at the decisions layer, instead of being delayed until the action is provided to the requesting AIN 620—e.g., one or more outbound packets corresponding to the received packet for which the action was requested may be sent from the action decisions layer itself to one or more destinations.

If an action corresponding to the packet received at the AIN 620 is not found in a repository or cache at the decisions layer 671, one or more decision logic implementation nodes (DLINs) 647 and/or state manager nodes 631 may be employed to determine the action to be performed in various embodiments. Individual ones of the DLINs and/or SMNs may perform respective pieces of the overall logic needed to determine the action for packets of the application whose traffic is to be processed. A pipeline comprising different combinations of DLINs 647 of one or more DHs 1644 may be used for different clients or applications in some embodiments. An LPO 645 may coordinate the decision making workflow, including the passage of the messages among the DLINs 647 required to determine the overall action to be taken in various embodiments. In at least one embodiment, customized executable programs that implement the decision making logic at various DLINs for an application may be provided by NFVS clients via control plane interactions, and deployed at the DHs of one or more DMCs. Note that the decision logic implementation pipelines may be fairly simple for some applications—e.g., a single DLIN may suffice for some network address translation tasks similar to the source information substitution tasks discussed earlier.

The particular action implementation cell to which a packet is to be directed from an origin endpoint may be selected based at least in part on any of various factors in different embodiments, including for example flow hashing based on source/destination addresses/ports of the packet, one or more virtual network interfaces which may have been associated programmatically with the cell and the application for which packet processing is being performed, locality considerations (e.g., network proximity or physical proximity of the cell to the origin endpoint), shuffle-sharding parameters, and so on. In at least some embodiments, the AINs 620 may be stateless—e.g., any given AIN of a selected AIC may be selected to process a given packet. In some embodiments, LPOs and/or DHs may also be stateless, while state information may be managed at the SMNs. The particular DMC to which a request for an action is to be transmitted in the event of a cache miss at an AIN may be selected based on a number of factors similar to those used for selecting the AIC, while an LPO or DH to which a request for an action is sent from the AIN may be selected at random from among the LPOs/DHs of the DMC in some embodiments. DLINs may also be stateless in at least one embodiment. In other embodiments, at least some state information pertaining to the set of packets to be processed by a node may be stored at an AIN, an LPO, a DH or DLIN. In some embodiments, once a particular AIN has been selected for a particular group or flow of packets, that same AIN may be used for one or more other packets of the group or flow. Similarly, in some embodiments once a given set of components (LPOs, DLINs, SMNs, etc.) has been identified at the decisions layer for a particular group or flow of packets, that group of components may also be used for any subsequent decision making operations for that group or flow.

State information corresponding to the flow or packet group to which the received packet belongs, including the identified action (such as a NAT action implementing address and port substitution operations similar to those discussed earlier), may be stored or persisted at a distributed state manager (DSM) 651 associated with a DMC 642 at which the action is identified in some embodiments. A variety of state information elements in addition to the action, including for example information regarding the rate at which packets of the flow are received and processed, the most recent time at which a packet of the flow was processed, etc., may be persisted at the DSM 651 in various embodiments. In some embodiments, AINs may periodically or on demand transmit updated state information for a given flow to the appropriate DSMs. In at least one embodiment, a DSM 651 may comprise a plurality of state manager nodes (SMNs) of a distributed hash table organized as a logical ring, with individual ones of the ring nodes being responsible for storing state information for a respective range or collection of key values associated with flows (e.g., the sub-ranges of 6-tuple flow hash values discussed earlier). In some embodiments, each node of the DHT may be implemented at a respective physical or virtual machine. In one embodiment, state information for a given flow may be replicated at several nodes of a DSM for higher availability and fault tolerance—e.g., one node may store a primary copy of the state information, while one or more non-primary copies may be stored at other nodes. In addition to or instead of distributed hash tables, other types of state repositories may be employed in some embodiments.

In at least one embodiment, a single replicable cell may comprise resources of both the action implementation layer 641 and the action decisions layer 671—e.g., one or more action implementation nodes 620, logic pipeline orchestrators 645, and/or distributed state managers 651 may be incorporated into a single multi-layer NFVS cell. In some embodiments, some cells may differ in their processing capacity from other cells at the same layer—e.g., a DMC categorized as a "large" DMC may comprise 9 DHs, while a DMC categorized as a "small" DMC may comprise 3 DHs. In at least some embodiments, at least some the resources of the NFVS may be utilized in a multi-tenant mode—e.g., a given AIC or a given DMC may be designated for use for more than one application of more than one client. In one embodiment, a cell-based approach may not necessarily be employed at one or more layers of the NFVS—instead, for example, a pool of nodes and/or DSMs may be set up for each layer and the appropriate number of nodes/DSMs may be assigned to individual applications or clients from the pool(s).

In at least some embodiments, an NFVS client may submit executable programs to be used for packet processing action implementation and/or decision making, and the NFVS may deploy the supplied executable programs at appropriate execution platforms. Such customizable executable programs may be referred to as "plugins" in at least some embodiments, as they may be deployed onto a common infrastructure using a standardized set of programmatic interfaces at the NFVS. In various embodiments in which clients supply or indicate the plugins, the NFVS control plane may validate the plugins, e.g., to ensure that the plugins do not violate security related and/or other acceptance criteria, before deploying the plugins and initiating packet processing using the plugins. In at least some embodiments, instead of supplying executable programs to the NFVS, clients may provide pointers of remote sources (e.g., URLs at which programmatic requests can be directed by NFVS components such as LPOs) that can be used to perform the decision making tasks and/or the packet processing actions.

A wide variety of packet processing actions, associated with packets of any desired networking protocol (e.g., protocols of the TCP/IP family or other families), may be implemented using an architecture of the kind shown in FIG. 6. In different embodiments, for example, load balancing, distributed network address translation using algorithms similar to the partially-reversible hashing algorithm discussed earlier, packet replication such as multicast, anycast and other actions that involve packet header manipulation may be performed. In at least one embodiment, actions that involve extraction, analysis and/or modification of packet data payloads, such as encryption/decryption or the like, may also or instead be performed. The source and destination endpoints of the traffic being processed may in some embodiments be configured within isolated virtual networks set up on behalf of respective clients of a virtual computing service. Note that in at least some embodiments, a distributed network address translator implementing the port allocation techniques described in the context of FIG. 1 and other figures earlier may not necessarily utilize the resources of an NFVS 602.

Example NAT-Related Interactions Between NFVS Layers

Figure 7:
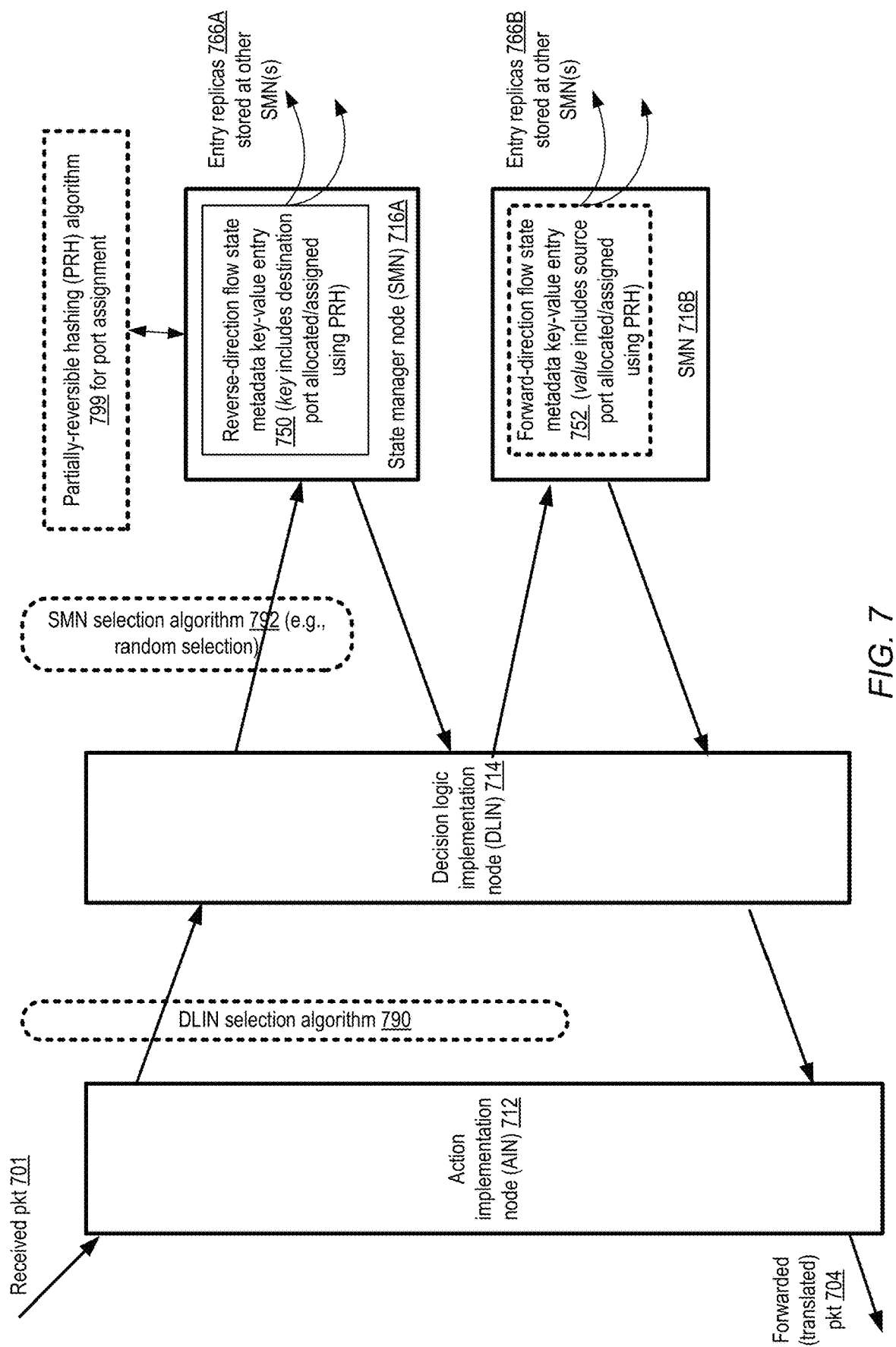
FIG. 7 illustrates example network address translation related interactions between layers of a network function virtualization service, according to at least some embodiments.

FIG. 7 illustrates example network address translation related interactions between layers of a network function virtualization service, according to at least some embodiments. In the depicted embodiment, a multi-layer network function virtualization service similar to NFVS 602 of FIG. 6 may be used for distributed network address translation. A received packet 701 of a network flow may first be examined at an action implementation node (AIN) 712 of the NFVS, e.g., to determine whether an action to be performed for packets of that flow is already present at the AIN 712. If no such action is found, a DLIN selection algorithm 790 may be used to select a particular decision logic implementation node 714 of the NFVS, and the packet may be sent to the selected DLIN 714. If the DLIN 714 is also unable to find, in its own cache, an action to be implemented for the packet, the packet may be sent on to a selected state manager node (SMN) 716A in the depicted embodiment. The SMN 716A may be selected using any of various algorithms 792 in different embodiments—e.g., in one embodiment, a random selection algorithm may be used to identify the particular SMN to be used from among a plurality of SMNs of a distributed state manager of the NFVS.

In the depicted embodiment, a partially-reversible hashing (PRH) algorithm 799 similar to algorithm 302 described earlier in the context of FIG. 3 may be used at the SMN 716A to select and allocate a substitute destination port for the reverse-direction flow corresponding to the received packet 701. After a port has been selected and allocated, a reverse-direction flow state key-value entry 750 may be stored at the SMN 716A, and one or more additional replicas 766A may be stored at other SMNs. For example, in one embodiment, three copies of each flow state metadata entry may be stored: one at a primary SMN (e.g., SMN 716A) designated for the entry, another at a secondary SMN, and another at a tertiary SMN. The key of the reverse-direction entry 750 may include (or be based on) the destination port allocated or assigned using the PRH in the depicted embodiment, while the value portion of the key-value entry may include the address and port of the traffic origin from which packet 701 was received at the AIN. Because the key is based on the allocated port, a key-based lookup in a data structure in which the reverse-direction flow state metadata entries are stored may be sufficient to determine whether a given port number has already been allocated for a given 5-tuple.

The 6-tuple which was populated using the PRH algorithm 799 may be provided to the DLIN 714 in the depicted embodiment from SMN 716A. The DLIN 714 may in turn provide the 6-tuple to a second SMN 716B, which is configured to store the forward-direction flow state metadata key-value entry for the flow to which packet 701 belongs. In at least some embodiments, the forward-direction flow state metadata key-value entry may also be stored at SMN 716A, i.e., state information for both directions of the flow's traffic may be co-located. Such co-location may help reduce the number of messages that have to be transmitted, for example, to incorporate common state information changes (e.g., TTL values) in the entries for both directions, or to complete the initialization of the entries for both directions. Note that the key used for the forward-direction entry 752 may not include the allocated destination port selected using the PRH algorithm in the depicted embodiment; instead, the value portion of the key-value entry 752 may include the allocated port.

Example Pathways for Packets Processed at NFVS

As mentioned earlier, in some embodiments distributed network address translators similar to those described above may at a network function virtualization service which is one of a suite of numerous network-accessible services of a provider network. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in various embodiments. At least some provider networks may also be referred to as "public cloud" environments in some embodiments. A given provider network may include numerous data centers hosting various resource pools, such as collections of physical and/or virtualized compute servers, storage devices, networking equipment and the like, needed to implement, configure and distribute the infrastructure and services offered by the provider.

Figure 8:
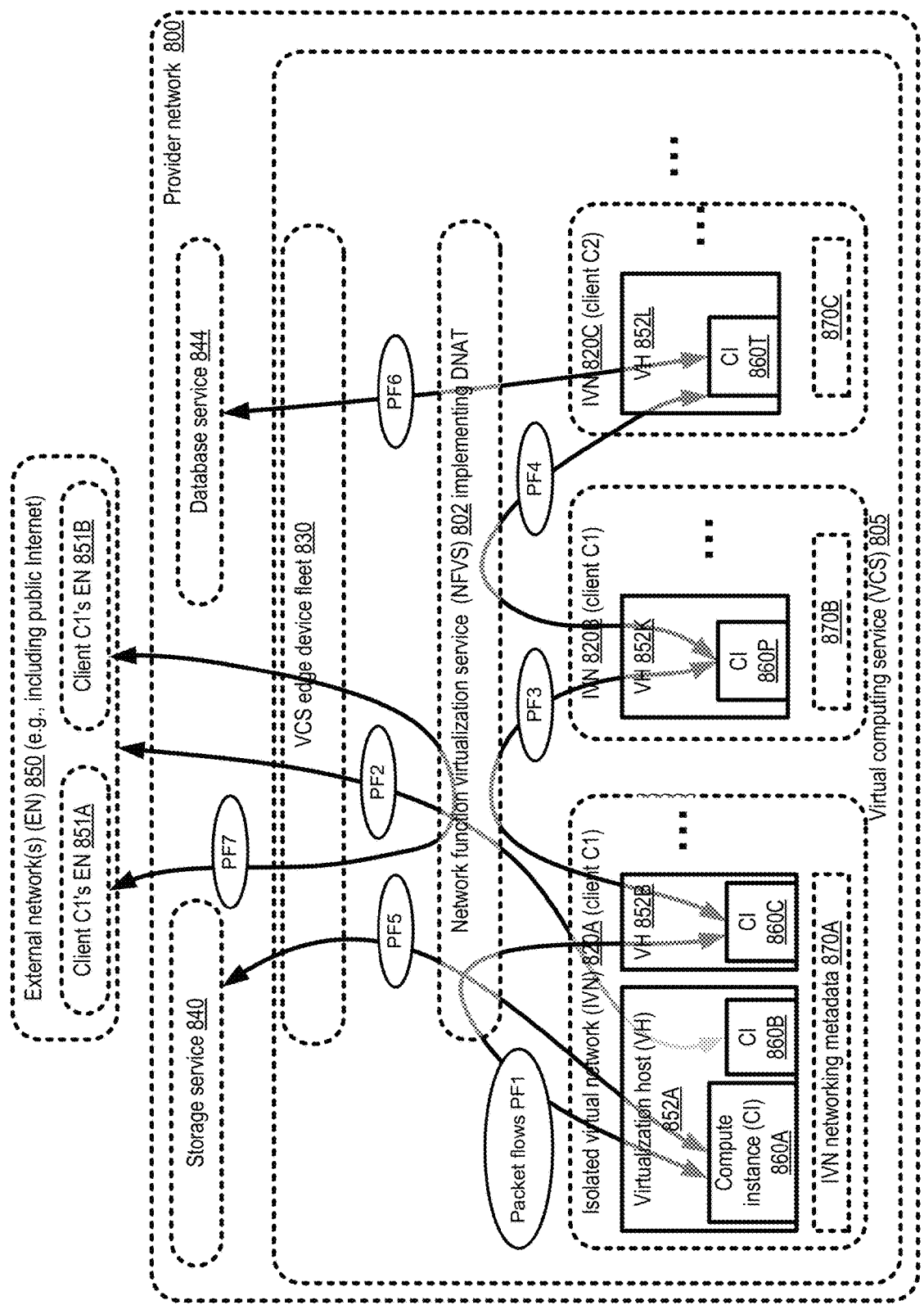
FIG. 8 illustrates examples of the use of network address translation and other network function virtualization operations along pathways which may originate or terminate at isolated virtual networks of a provider network and/or at networks external to a provider network, according to at least some embodiments.

FIG. 8 illustrates examples of the use of network address translation and other network function virtualization operations along pathways which may originate or terminate at isolated virtual networks of a provider network and/or at networks external to a provider network, according to at least some embodiments. Several different network-accessible services may be implemented at provider network 800 of FIG. 8, including, for example, a virtual computing service (VCS) 805, a storage service 840 and a database service 844. The VCS may comprise a plurality of virtualization hosts (VHs) 852, such as 852A, 852B, 852K and 852L in the depicted embodiment, at each of which one or more compute instances (CIs) 860 (e.g., CIs 860A, 860B, 860C, 860P and 860T) may be instantiated on behalf of one or more VCS clients. A given compute instance 860 may, for example comprise a guest virtual machine in the depicted embodiment. Each virtualization host may also include other components not shown in FIG. 8, such as a respective virtualization manager acting as an intermediary between the CIs of the host and at least some of the hardware components of the host. In some embodiments, at least some portions of a virtualization manager may be implemented at an offloading device, such as a card that is attached via a peripheral bus to the CPUs of the virtualization host. Such offloading techniques may, for example, enable a larger fraction of the computing resources of the virtualization hosts to be deployed to the CIs set up on behalf of clients, as opposed to being deployed for virtualization management tasks.

In at least some embodiments, the VCS 805 may support the capability of setting up isolated virtual networks (IVNs) on behalf of various clients. Each IVN 820 may include a respective subset of resources of the VCS, over whose networking configuration the client is granted substantial flexibility. For example, IVN 820A (established for client C1) includes VHs 850A and 850B in the depicted embodiment, IVN 820B (also set up for client C1) includes VH 850K, and IVN 820C (set up for client C2) includes VH 850L. A given client such as C1 may establish multiple IVNs for various purposes—e.g., IVN 820A may be set up for hosting a web application for access from external networks 850 (which may for example include portions of the public Internet and/or a client-owned network) such as network 851A, while IVN 820B may be set up for the development of the web applications. Generally speaking, the VCS may allow the traffic associated with a given IVN to be isolated or separated from the traffic associated with any other IVN in the depicted embodiment, unless of course the clients for whom the IVNs are established indicate otherwise. With respect to a given IVN, in some embodiments the client may make various networking decisions such as IP address assignment, subnet configuration and/or enforcement of security rules regarding incoming and outgoing traffic independently of the corresponding decisions made with respect to other IVNs. For example, a particular private IP address which is assigned to a CI 860B at VH 852A of IVN 820A may also happen be assigned to VM 860T at VH 852L of IVN 820C. Thus, in at least some embodiments, with respect to many aspects of network management, each IVN may effectively be treated by the corresponding client as a standalone network such as one which may be established at the client's private data center. Each IVN may have an associated set of networking metadata 870 in the depicted embodiment, such as 870A for IVN 820A, 870B for IVN 820B, and 870C for IVN 820C. IVNs may also be referred to as virtual private clouds in some embodiments.

In the embodiment depicted in FIG. 8, a network function virtualization service (NFVS) 802, with functionality and capabilities similar to NFVS 602 of FIG. 6, may be implemented at least in part for traffic originating at or directed to the compute instances 860. For example, distributed network address translation using the partially-reversible hashing algorithm for port allocation may be performed at NFVS 802 for traffic of some of the compute instances 860. The networking metadata 870 of an IVN may include addresses for the action implementation nodes of NFVS 802 for various packet processing requirements associated with the IVN in the depicted embodiment. For example, if source address substitution is to be implemented for packets originating at CIs of IVN 820A, in some embodiments a distributed NAT appliance for the packets may be configured specifically for those packets. The metadata 870A may include an indication of one or more IP addresses assigned to the NAT appliance, which may be mapped to one or more action implementation nodes of NFVS 802, e.g., using virtual network interfaces. Similarly, the IVN networking metadata may include indications of the interfaces and/or addresses of the NFVS which are to be used for other types of packet processing applications, including multicast, anycast and the like in different embodiments.

Some types of packet processing may be required for traffic originating and terminating within a given IVN in the depicted embodiment, such as packet flows PF1 which comprises packets flowing between different CIs of IVN 820A (e.g., 860A and 860C). Other types of transformations may be implemented with respect to packet flows originating at external networks 850 and destined for CIs such as 860B within one or more IVNs as indicated by the arrow labeled PF2 (packet flows 2). For example, an application may be implemented at CI 860B, and client requests directed to that application may originate at various devices on the public Internet and/or client-owned external networks 851A or 851B. Response to such requests may travel in the reverse direction—e.g., from CI 860B to the external network. Request packets as well as response packets may pass through the NFVS 802 in the depicted embodiment for packet flows PF2. In at least some embodiments, a fleet of VCS edge devices 830 may be used as intermediaries between the VCS and other services or external networks 850. The VCS edge devices may be responsible for implementing an encapsulation protocol used at the VCS in some embodiments, e.g., for directing packets addressed to a particular CI 860 to a NIC (network interface card) associated with a virtualization manager at the CI's virtualization host.

In some embodiments the NFVS 802 may be used as a scalable and secure channel for traffic between IVNs. For example packet flows PF3 may comprise packets transmitted between IVNs 820A and 820B of the same client C1 via NFVS 802, while packet flows PF4 may comprise packets transmitted between the IVNs of two different clients (IVN 820B of client C1 and IVN 820C of client C2) in the depicted embodiment. In some embodiments in which the NFVS 802 is to serve as a conduit between two different clients' IVNs, both clients may have to approve the establishment of connectivity before the NFVS starts processing the cross-IVN packets. The NFVS 802 may also be used for processing packet flows between different services of the provider network in some embodiments. For example, packet flows PF5 and PF6 between IVNs of the VCS and other services such as database service 844 or storage service 840 may be processed at NFVS 802 in the depicted embodiment. In at least one embodiment, the NFVS 802 may be used to process packets directed from one external network to another—e.g., packet flows PF7, comprising packets flowing between client C1's first external network 851A and second external network 851B, may be processed using the NFVS 802. It is noted that not all the CIs of the VCS may be assigned to clients of the VCS; some CIs may be used for internal purposes in various embodiments. In at least one embodiment, some CIs may be used for the nodes at one or more layers of the NFVS. In some embodiments, the NFVS may not necessarily be employed for one or more of the kinds of traffic flows illustrated in FIG. 8.

Example NAT-Related Programmatic Interactions

Figure 9:
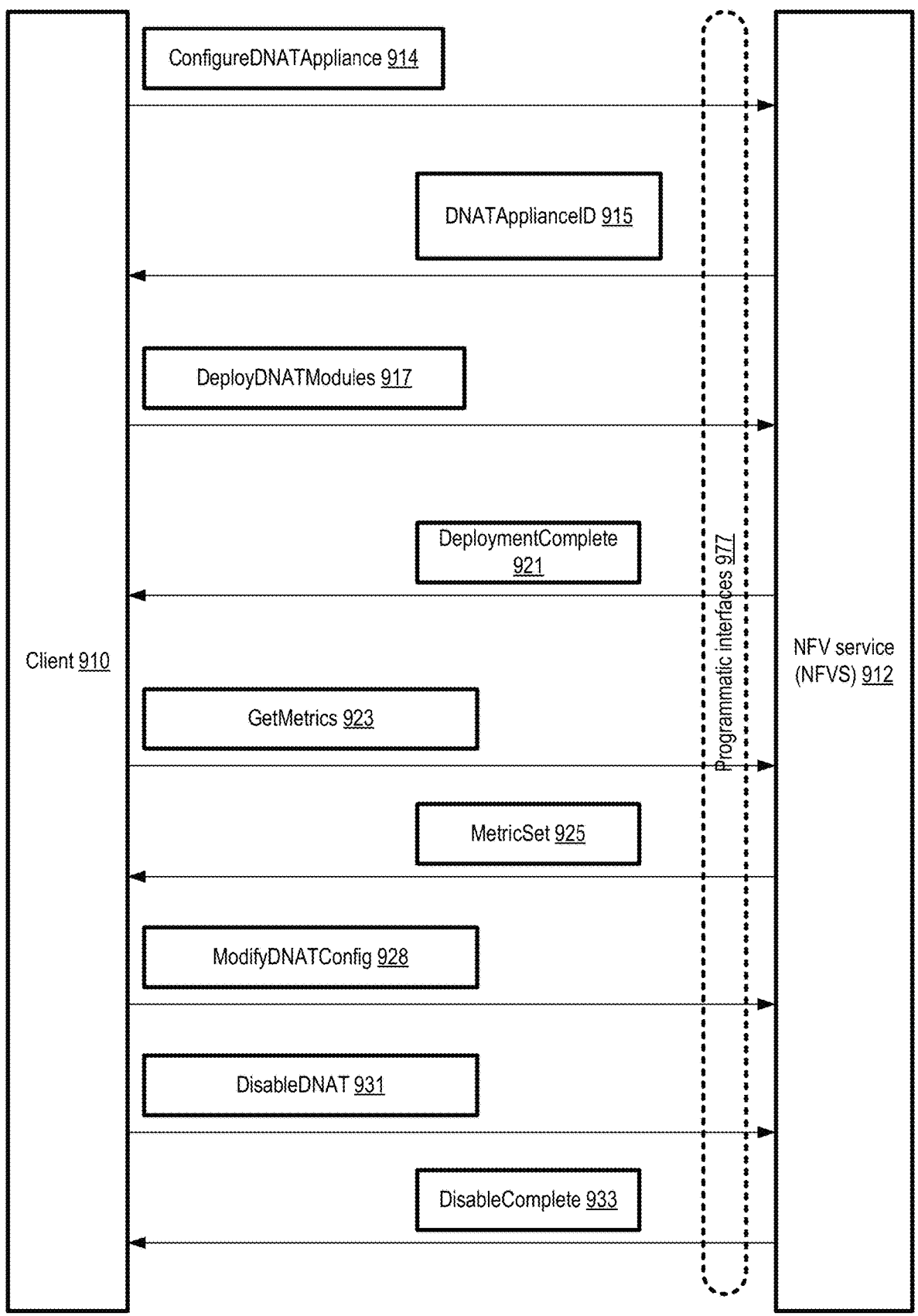
FIG. 9 illustrates example programmatic interactions between clients and a network function virtualization service supporting distributed network address translation, according to at least some embodiments.

FIG. 9 illustrates example programmatic interactions between clients and a network function virtualization service supporting distributed network address translation, according to at least some embodiments. In the depicted embodiment, an NFVS 912, similar in capabilities and functionality to NFVS 602 of FIG. 6, may include a web service frontend including web servers implementing a set of programmatic interfaces 977 such as a set of application programming interfaces (APIs), a web-based console, command line tools, graphical user interfaces and the like, which may be used by clients 910 to submit various types of requests to configure packet processing for their applications.

In at least some embodiments, a client 910 may submit a ConfigureDNATAppliance request 914 via a programmatic interface 977 to the NFVS. Such a configuration request may indicate various parameters of the DNAT operations to be performed on behalf of the client, such as the allowed ranges of port numbers to be allocated, the flow hash values permitted, the set of traffic origins and destinations, etc. In some embodiments, the request 914 may comprise indications of one or more decision making logic plugin modules to be used for decision making and/or action implementation on behalf of the client 910 in the depicted embodiment. In some cases, a request 914 may include NAT decision making logic such as executable programs or scripts, while in other cases pointers to sources from which such decision making logic may be accessed (e.g., URLs to which web service requests may be transmitted to access the decision making logic) may be included in the request 914. In response, the NFVS may perform one or more validation/verification actions to ensure that the combination of configuration settings, plugin modules or programs meet acceptance criteria. If the requested configuration is found acceptable, the NFVS may transmit a DNATApplianceID message 915 to the client in the depicted embodiment, indicating that metadata representing the requested DNAT appliance has been saved at the NFVS control plane, and that the requested appliance can be referred to in subsequent interactions using a specified appliance identifier.

The client 910 may submit a DeployDNATModules request 917 to the NFVS in the depicted embodiment, indicating that a set of NFVS nodes/cells collectively responsible for implementing a referenced DNAT appliance be activated and start processing packets. In some embodiments, the client may specify details such as the number of action implementation nodes, decision logic implementation nodes, state manager nodes and the like to be used for the appliance. In other embodiments, decisions regarding such details may be left to the NFVS control plane. The NFVS may allocate an initial set of resources (e.g., physical hosts, virtual machines etc.) for the deployment, deploy the DNAT modules to the resources, and transmit a DeploymentComplete message 921 to the client indicating that the NFVS is ready for application traffic to commence in the depicted embodiment. Packets received from the origin endpoints of the client's application may then be processed, and corresponding output packets may be transmitted to the intended recipient endpoints in accordance with the decision logic implemented by the modules.

In various embodiments, the NFVS may expose a number of metrics to clients, e.g., indicating the size of the configuration set up for a client, the resource utilization levels at various platforms of the configuration, the size of stored state information, response times for various types of messages, and the like. In the depicted embodiment, a GetMetrics request 923 may be submitted by the client via programmatic interfaces 977 to view some or all of the available metrics at various points during the lifetime of the client's DNAT appliance. The requested metrics may be provided, for example, via one or more MetricSet messages 925. In at least some embodiments, easy-to-understand visualizations of the requested metrics may be provided via an interactive interface, allowing the client to for example zoom in on subsets of the metrics, obtain temporal correlations of different subsets of the metrics, and so on. In some embodiments, a client may request changes to the DNAT appliance configuration (e.g., requesting additional cells at the action implementation layer and/or the decisions layer) by submitting ModifyDNATConfig messages 928.

If/when a client wishes to terminate the execution of their packet processing plugins, in some embodiments a DisableDNAT message 931 may be submitted in various embodiments, identifying the specific distributed network address translator appliance that is to be decommissioned. In response, the appropriate configuration operations to disable/uninstall the modules of the DNAT may be performed at the NFVS 912 in the depicted embodiment, and a DisableComplete message 933 may be sent to confirm that the requested disabling operations have been completed successfully. It is noted that other types of DNAT-related programmatic requests may be supported in some embodiments than those shown in FIG. 9, and that at least some of the illustrated requests may not be supported in some embodiments.

Methods for Distributed Network Address Translation

Figure 10:
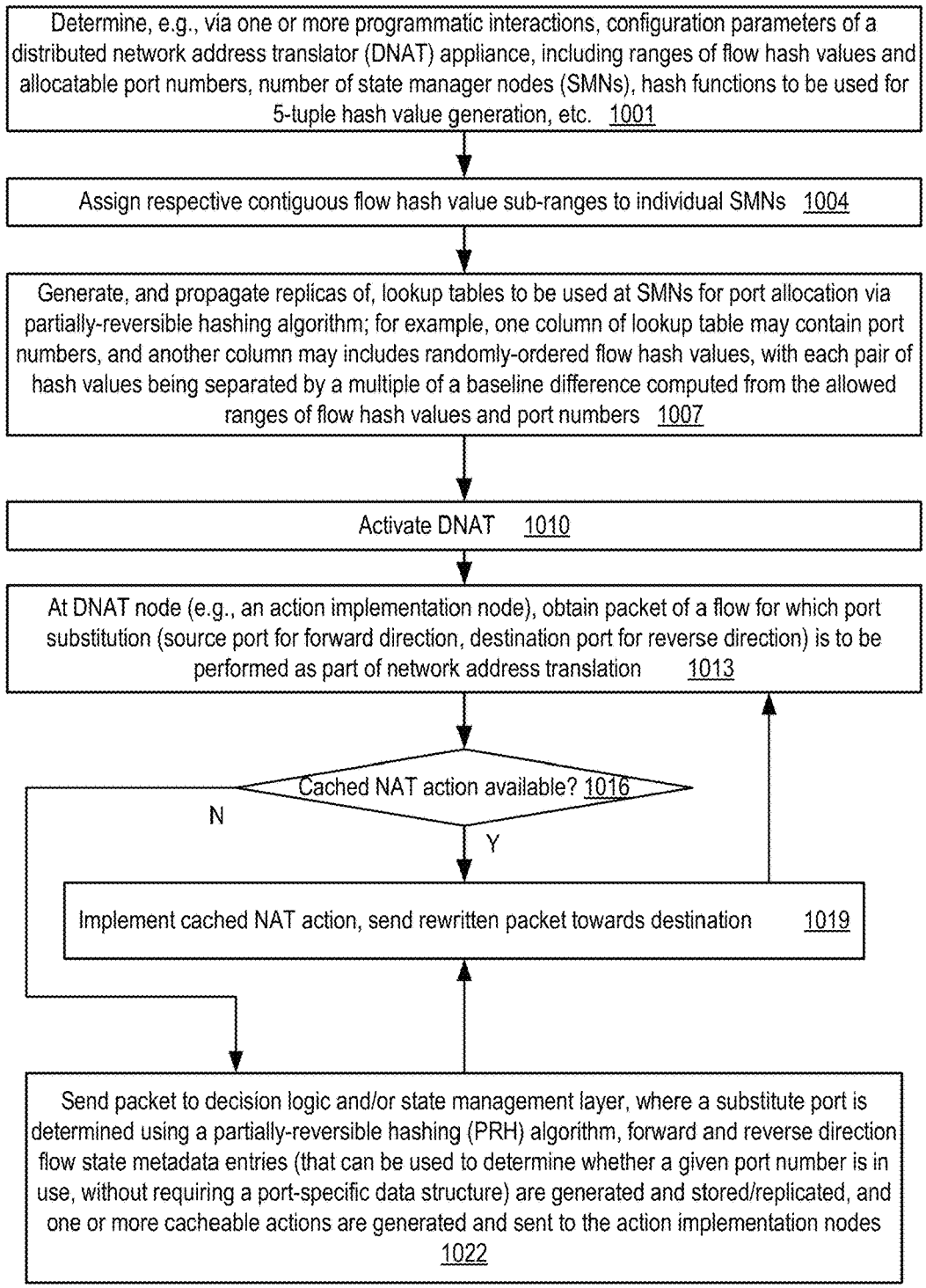
FIG. 10 is a flow diagram illustrating aspects of operations that may be performed to implement distributed network address translation, according to at least some embodiments.

FIG. 10 is a flow diagram illustrating aspects of operations that may be performed to implement distributed network address translation, according to at least some embodiments. As shown in element 1001, configuration parameters of a distributed network address translator (DNAT) appliance similar to appliance 102 of FIG. 1 may be determined, including for example the allowed ranges of flow hash values and port numbers, the number of state manager nodes (SMNs), hash functions to be used for generating intermediate hash values from incomplete flow tuples as part of a partially reversible hashing (PRH) algorithm, hash functions to be used to generate hash values from complete flow tuples, and so on. In some embodiments, at least a subset of the parameters may be obtained via programmatic interactions with a client of a network address translation service or a network function virtualization service similar in functionality and features to NFVS 602 of FIG. 6.

Respective contiguous flow hash value sub-ranges may be assigned to individual ones of the SMNs in the depicted embodiment (element 1004), e.g., in a manner similar to that shown in FIG. 4. A lookup table to be used for the PRH algorithm he may be generated, e.g., at a control plane component of an NFVS or NAT service, with entries comprising mappings between port numbers and intermediate flow hash values in various embodiments (element 1007). For example, in some embodiments, one column of the lookup table may comprise port numbers in the allowed range, and another column may comprise corresponding randomly-selected hash values from the allowed flow hash range. In some embodiments, a "baseline difference" may be computed, and the hash values included in the entries of the lookup table may be selected such that in any given pair of hash values, the first value differs from the second by some multiple of the minimum difference. Such a randomized and minimum-difference based approach may result in a more uniform overall distribution of port number sets among the different SMNs, for example, avoiding problematic issues that may result if the port number range is subdivided among the SMNs in sequential chunks. Respective replicas of the lookup tables may be provided to, and stored at, each of the SMNs in the depicted embodiment, and the replicas may be used without modifications to any of the mappings during the lifetime of the network address translator.

The DNAT may be activated (element 1010), e.g., in response to a programmatic request from a client. In various embodiments, network packets may be transmitted to the DNAT from one or more traffic sources for which the DNAT was established. At a node of the DNAT (such as an action implementation node (AIN) similar to the AINs discussed in the context of FIG. 1), a packet of a flow for which port substitution is to be performed as part of the network address translation functionality may be received (element 1013). If a cached NAT action is available at the node (e.g., in a cache of executable modules) as determined in operations corresponding to element 1016, the cached NAT action may be implemented (element 1019), and a rewritten version of the packet (with different source address and port values than those indicated in the received packet) may be transmitted towards a destination or recipient indicated in the received packet in the depicted embodiment.

If, in operations corresponding to element 1016, a previously-generated or previously-determined action that is applicable to the received packet is not identified, the received packet may be directed to another node of the DNAT, such as a decision logic implementation node (DLIN) (similar to the DLINs discussed in the context of FIG. 6) or a selected state manager node (SMN) in the depicted embodiment. There, a substitute port for the flows to which the packet belongs may be determined using the PRH algorithm (e.g., using logic similar to that discussed in the context of FIG. 3 and FIG. 11) in various embodiments (element 1022). In some embodiments, the received packet may first be sent to a DLIN, and then (if the DLIN also cannot identify a pre-generated action) from the DLIN to an SMN. A substitute network address (e.g., an address assigned to the DNAT itself, or to some other networking intermediary device) may also be selected as the source address for the forward-direction flow (and the destination address for the reverse-direction flow) in some embodiments, as discussed in the context of FIG. 3. After the substitute address and port have been identified, forward-direction and reverse-direction flow state metadata entries may be stored at the state management layer of the DNAT (e.g., at the same SMN, or at different SMNs).

In at least one embodiment, such entries may be stored in key-value stores. For the reverse-direction entry, the key may be based at least in part on the substitute port in such an embodiment, so a key-based lookup of the collection of stored flow hash entries may be sufficient to determine whether a given port has already been allocated or not; separate port-specific data structures may not be required. As a result, in such an embodiment, the packet for which the port has been allocated may first be sent to an SMN selected (e.g., at random from among a configured plurality of SMNs of the DNAT) as the node responsible for storing the reverse-direction flow state entry. In various embodiments, an executable version of the address translation/substitution operation to be performed for the flow to which the received packet belongs may be generated and/or stored as part of the flow state metadata. The action may be sent to the action implementation node in the depicted embodiment, where it may be implemented (element 1019).

Operations corresponding to elements 1013 onwards may be repeated for each received packet in the embodiment depicted in FIG. 10, with the majority of packets being processed at the nodes at which they are received (e.g., the AINs), without requiring new state metadata entries to be generated. Note that in some embodiments, the action may be implemented at the same DNAT node at which the port is allocated using the PRH algorithm—that is, the functionality of an SMN, DLIN, and AIN may be combined into a single node of a DNAT, and separate layers as discussed in the context of FIG. 6 may not be required.

Figure 11:
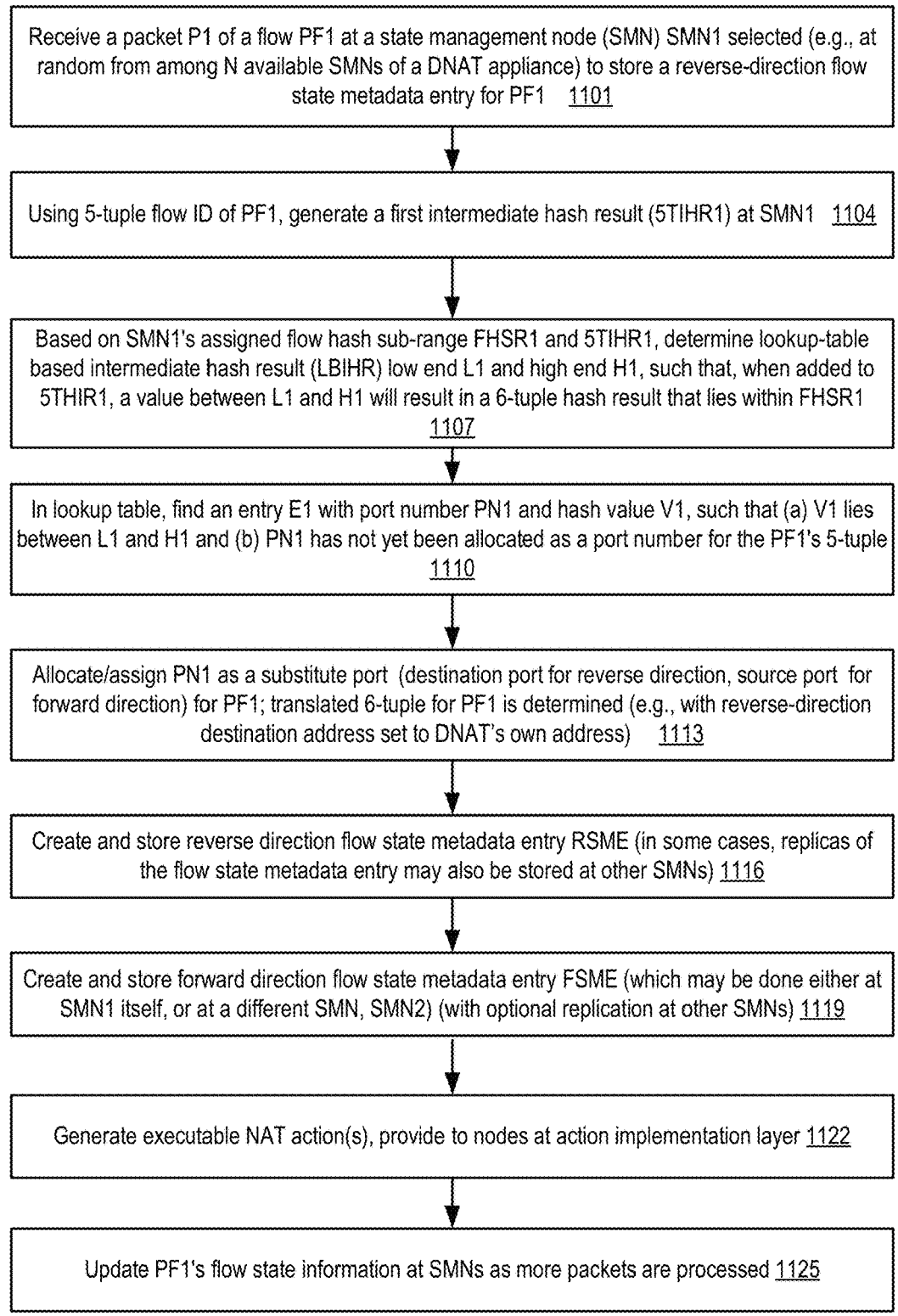
FIG. 11 is a flow diagram illustrating aspects of operations that may be performed to implement a hashing algorithm for allocating ports as part of distributed network address translation, according to at least some embodiments.

FIG. 11 is a flow diagram illustrating aspects of operations that may be performed to implement a hashing algorithm for allocating ports as part of distributed network address translation, according to at least some embodiments. As shown in element 1101, a packet P1 of a flow PF1 may be received at a state manager node (SMN1) of a distributed network address translator (DNAT) appliance. SMN1 may have been selected, e.g., at random, from among N available state manager nodes of the appliance, to store a reverse-direction flow state metadata entry for PF1 in the depicted embodiment. In other embodiments, SMN1 may not necessarily be selected at random—instead, for example, metrics such as current resource utilization levels may be used to select a lightly-loaded SMN. Each of the SMNs may have an assigned flow hash sub-range in the depicted embodiment (based on a subdivision of the overall flow hash range values, using logic similar to that discussed in the context of FIG. 4), indicating the range of reverse-direction (and forward direction) flow hash values for which respective entries are to be stored at the SMN. For example, SMN1's reverse-direction flow hash sub-range may be FHSR1.

Using logic similar to that discussed in the context of FIG. 3, a first intermediate hash result (5TIHR1) corresponding to a 5-tuple or incomplete set of reverse flow identifier elements of PF1 may be generated (element 1104). The set of flow identifier elements may be incomplete in that while the reverse direction source address, source port, destination address (e.g., an address of an intermediary network device such as the DNAT appliance), network protocol, and appliance identifier may be known, the destination port for the reverse direction may yet to be determined.

Based at least in part on SMN1's assigned flow hash sub-range FHSR1 and 5TIHR1, a range of possible lookup-table based intermediate hash results (LBIHRs) may be determined in the depicted embodiment (element 1107). The low end L1 and the high end H1 for the LBIHRs may be determined such that, when added to 5TIHR1, the sum of the two intermediate hash results lies within FHSR1. Within a lookup table stored at SMN1, whose entries indicate respective mappings between port numbers and LBIHRs, an entry E1 with port number PN1 and LBIHR value V1 may be identified, such that (a) V1 lies between L1 and H1 and (b) PN1 has not yet been allocated as a port number for PF1's flow tuple (element 1110). The lookup table may have been generated, e.g., at a control plane component of a network function virtualization service at which the DNAT appliance is configured, and copies of the lookup table may have been propagated to the various SMNs during SMN initialization in at least some embodiments. To determine whether a port number PN1 is already in use for the 5-tuple, in at least some embodiments a 6-tuple-based key that includes PN1 as the destination port may be generated, and the collection of reverse-direction flow state metadata entries stored at SMN1 may be queried to determine whether an entry corresponding to the key is already stored in the collection; if such an entry does exist, this would indicate that PN1 is in use, and if such an entry does not exist, this would indicate that PN1 is not in use.

PN1 may be allocated or assigned as a substitute port for the flows to which P1 belongs in the depicted embodiment (element 1113), to be used as the destination port for the reverse direction and the source port for the forward direction. As such, a full 6-tuple for both directions of the traffic flows to which P1 belongs may be known at this stage. A reverse direction flow state metadata entry RSME may be generated and stored at SMN1 (element 1116), e.g., in a key-value data store using a key based on the 6-tuple that comprises PN1 as the destination port. In at least some embodiments, one or more replicas of RSME may be stored at other SMNs, e.g., before the rewritten packet corresponding to P1 is sent on towards the recipient indicated in P1; that is, the task of creating flow state metadata entries for a given direction of a given flow may not be considered complete until entries have been replicated at multiple SMNs. In some embodiments, the SMNs may be configured as a distributed hash table (DHT) ring, with respective SMNs being responsible for storing a primary replica, a secondary replica, etc., of a given flow state metadata entry. In addition to an indication of the action to be taken for packets to which the flow belongs, in various embodiments a flow state metadata entry may also include, for example, a time-to-live value indicating how long the entry is to be retained, metrics such as the number of packets processed, when the most recent packet was processed, and so on.

In the depicted embodiment, a forward direction flow state metadata entry FSME may also be generated and stored for the flow to which P1 belongs (element 1119). The 6-tuple used to generate the key for FSME may not include the substitute port number allocated in operations corresponding to element 1113 in some embodiments; instead, the key may be based on the original (un-substituted) source port indicated in P1, while the value stored in FSME may indicate the substitute port as the source port. In at least some embodiments, FSME (i.e., FSME's primary copy in scenarios in which replication is being used for the flow state metadata entries) may be stored at a different SMN (e.g., SMN2), and not necessarily at SMN1.

Executable representations of the NAT actions to be performed with respect to packets of PF1 may be transmitted to the appropriate DNAT action implementation nodes in the depicted embodiment (element 1122), where the actions may be implemented for P1 and subsequent packets (if any) of PF1. As more packets are processed, PF1's flow state information entries FSME and RSME may be updated, e.g., with the latest metrics of the flow (element 1125). Operations corresponding to elements 1101-1125 may be performed for various packets for which flow state entries have not yet been created at the DNAT It is noted that in various embodiments, some of the operations shown in FIG. 10 or FIG. 11 may be implemented in a different order than that shown in the figures, or may be performed in parallel rather than sequentially. Additionally, some of the operations shown in FIG. 10 or FIG. 11 may not be required in one or more implementations.

Use Cases

The techniques described above, of allocating substitute ports in a consistent manner at a distributed network address translator, without requiring separate port-related data structures to be maintained, updated and/or synchronized among nodes, may be useful in a variety of scenarios. As more and more distributed applications are migrated to provider network environments, the need for scalable and fault-tolerant management of packet transformation operations such as network address translation is also increasing. To achieve desired levels of scalability and availability, configuring network address translators with a single state manager node may not be an option; as a result, the responsibilities of storing flow state metadata entries and port allocation may both have to be spread among multiple state manager nodes. The partially-reversible hashing based technique described may enable both types of tasks to be performed without requiring data structures for port management separate from the flow state metadata entries. As a result, some of the potential consistency related problems that may arise if port numbers are managed using distinct data structures than state flow metadata may be avoided, and the memory or storage resources required for network address translation may also be reduced.

Illustrative Computer System

Figure 12:
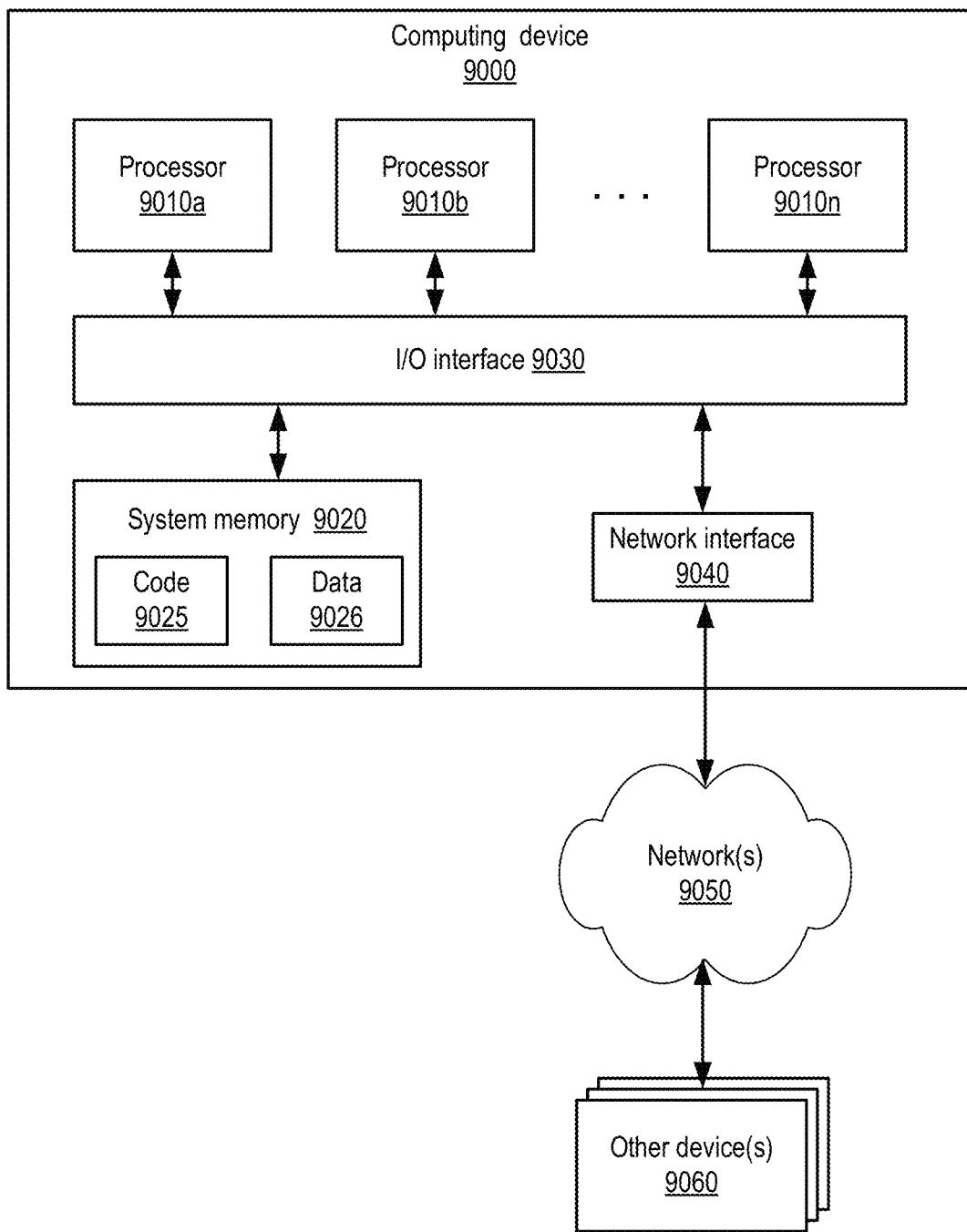
FIG. 12 is a block diagram illustrating an example computing device that may be used in at least some embodiments.

In at least some embodiments, a server that implements one or more of the control-plane and data-plane components that are used to support network address translation described herein, as well as other types of packet processing and network function virtualization tasks, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a distributed network address translation appliance comprising a plurality of computing devices;
    wherein the plurality of computing devices include instructions that upon execution on or across one or more processors cause the distributed network address translation appliance to:
        in response to a determination that one or more flow state metadata entries corresponding to a first packet are to be generated:
            direct the first packet to a particular node of a plurality of state manager nodes of the distributed network address translation appliance, wherein the particular node is selected at random from the plurality of state manager nodes, and wherein the particular node is configured to store flow state metadata associated with network flows corresponding to a particular flow hash value range;
            apply, at the particular node, a hash function to a reverse-direction flow tuple of the first packet to obtain a first intermediate hash result, wherein the reverse-direction flow tuple comprises at least a source address, a source port, and a destination address, wherein the destination address is an address of a networking intermediary of the network flow, and wherein the reverse-direction flow tuple does not include a destination port;
            determine, at the particular node, using at least (a) the first intermediate hash result, (b) the particular flow hash value range, and (c) a lookup table, an unused port number to be assigned as the destination port for a reverse-direction flow of the first packet, wherein the lookup table comprises one or more entries including a first entry, wherein the first entry indicates a mapping between a port number and a second intermediate hash result;
            allocate, at the particular node, the unused port number determined using at least (a) the first intermediate hash result, (b) the particular flow hash value range, and (c) the lookup table as the destination port for the reverse-direction flow; and
            store, at the particular node, a reverse-direction flow metadata entry, wherein a key associated with the reverse-direction metadata entry is based at least in part on the assigned destination port;

cause a re-written packet to be transmitted to a recipient indicated in the first packet, wherein, in the re-written packet, a source address is the address of the networking intermediary, and a source port is the assigned destination port; and utilize the reverse-direction flow metadata entry, that is associated with the key that is based at least in part on the assigned destination port, to route at least one packet originating at the recipient indicated in the first packet.

2. The system as recited in claim 1, wherein the plurality of computing devices include instructions that upon execution on or across one or more processors cause the distributed network address translation appliance to:

select the unused port number based at least in part on a determination that a sum of the first intermediate hash result and the second intermediate hash result lies within the particular flow hash value range.

3. The system as recited in claim 1, wherein the plurality of computing devices include instructions that upon execution on or across one or more processors cause the distributed network address translation appliance to:

store, at another node of the plurality of state manager nodes, a replica of the lookup table; and assign, using the replica at the other node, another port number as a substitute port number to a flow associated with another packet.

4. The system as recited in claim 1, wherein the plurality of computing devices include instructions that upon execution on or across one or more processors cause the distributed network address translation appliance to:

determine, based at least in part on a comparison of (a) a range of permitted flow hash values and (b) a range of permitted port values, a baseline difference among intermediate hash results to be stored in the lookup table; and identify, using the baseline difference, a plurality of intermediate hash results, including the second intermediate hash result, for inclusion in respective entries of the lookup table.

5. The system as recited in claim 1, wherein the plurality of computing devices include instructions that upon execution on or across one or more processors cause the distributed network address translation appliance to:

store, at another node of the plurality of state manager nodes, a forward-direction flow metadata entry corresponding to the first packet, wherein a key associated with the forward-direction metadata entry is not based on the assigned destination port, and wherein the assigned destination port is indicated in a value stored in the forward-direction flow metadata entry.

6. A method, comprising:

performing, at one or more computing devices:

directing a first packet to a particular node of a plurality of state manager nodes of a network address translator, wherein the particular node is configured to store metadata associated with network flows corresponding to a particular flow hash value range;

determining, at the particular node, using at least (a) a first intermediate hash result, (b) the particular flow hash value range, and (c) a lookup table, a particular port number to be assigned as a substitute port for a flow associated with the first packet, wherein the first intermediate hash result is obtained from a flow tuple of the first packet, and wherein the lookup table comprises an entry indicating a mapping between the particular port number and a second intermediate hash result;

assigning, at the particular node, the particular port number, determined using at least (a) the first intermediate hash result, (b) the particular flow hash value range, and (c) the lookup table, as the substitute port for the flow associated with the first packet; and causing a second packet to be transmitted from the network address translator to a recipient indicated in the first packet, wherein, in the second packet, the source port is the assigned substitute port.

7. The method as recited in claim 6, further comprising performing, at the one or more computing devices:

selecting the particular port number based at least in part on determining that a sum of the first intermediate hash result and the second intermediate hash result lies within the particular flow hash value range.

8. The method as recited in claim 6, further comprising performing, at the one or more computing devices:

verifying, prior to assigning the particular port number, that a flow metadata entry indicating the particular port number as a destination port is not stored at the particular node.

9. The method as recited in claim 6, further comprising:

storing, at another node of the plurality of state manager nodes, a replica of the lookup table; and assigning, using the replica at the other node, another port number as a substitute port number to a flow associated with another packet received at the network address translator.

10. The method as recited in claim 6, further comprising determining, by the one or more computing devices:

determining, based at least in part on a comparison of (a) a range of permitted flow hash values and (b) a range of permitted port values, a baseline difference among intermediate hash results to be stored in the lookup table; and identifying, using multiples of the baseline difference, a plurality of intermediate hash results, including the second intermediate hash result, for inclusion in respective entries of the lookup table.

11. The method as recited in claim 6, wherein the lookup table comprises a plurality of entries including another entry, wherein the other entry indicates a mapping between (a) a higher port number than the particular port number and (b) another intermediate hash result which is lower than the second intermediate hash result.

12. The method as recited in claim 6, further comprising performing, at the one or more computing devices:

storing a reverse-direction flow state metadata entry corresponding to the first packet at the particular node, wherein a key used for the reverse-direction flow state metadata entry is obtained using the particular port number; and storing a forward-direction flow state metadata entry corresponding to the first packet at the particular node, wherein a value element of the forward-direction flow state metadata entry includes the particular port number.

13. The method as recited in claim 6, further comprising performing, at the one or more computing devices:

storing, at the particular node, a flow state metadata entry corresponding to the first packet; and replicating, prior to causing the second packet to be transmitted, the flow state metadata entry at another node of the plurality of state manager nodes.

14. The method as recited in claim 6, wherein the network address translator comprises one or more action implementation nodes, the method further comprising performing, at the one or more computing devices:
prior to directing the first packet to the particular state manager node,
receiving, at a first action implementation node of the one or more action implementation nodes, from a traffic origin, the first packet; and
determining that an executable action pertaining to the first packet is not cached at the first action implementation node.

15. The method as recited in claim 14, wherein the network address translator comprises one or more decision logic implementation nodes, the method further comprising performing, by the one or more computing devices:
prior to directing the first packet to the particular state manager node,
receiving, at a first decision logic implementation node of the one or more decision logic implementation nodes from the first action implementation node, the first packet; and
selecting, by the first decision logic implementation node, the particular node of the plurality of state manager nodes as a target for the first packet.

16. A non-transitory computer-accessible storage medium storing program instructions that when executed on one or more processors cause the one or more processors to implement a node of a network address translator, wherein the node is configured to:
obtain a first packet;
determine, using at least (a) a first intermediate hash result, (b) a particular flow hash value range assigned to the node, and (c) a lookup table, a particular port number to be assigned as a substitute port number for a flow associated with the first packet, wherein the first intermediate hash result is obtained from a flow tuple of the first packet, wherein the lookup table comprises an entry indicating a mapping between the particular port number and a second intermediate hash result;
assign the particular port number, determined using at least (a) the first intermediate hash result, (b) the particular flow hash value range assigned to the node, and (c) the lookup table, as the substitute port number for the flow associated with the first packet; and
cause a second packet to be transmitted to a recipient indicated in the first packet, wherein, in the second packet, the source port is the assigned substitute port number.

17. The non-transitory computer-accessible storage medium as recited in claim 16, wherein the node is further configured to:
select the particular port number based at least in part on determining that a sum of the first intermediate hash result and the second intermediate hash result lies within the particular flow hash value range.

18. The non-transitory computer-accessible storage medium as recited in claim 16, wherein the node is further configured to:
verify, prior to assigning the particular port number, that a flow metadata entry indicating the particular port number as a destination port is not stored at the node.

19. The non-transitory computer-accessible storage medium as recited in claim 16, wherein the lookup table comprises a plurality of entries including another entry, wherein the other entry indicates a mapping between (a) a higher port number than the particular port number and (b) another intermediate hash result which is lower than the second intermediate hash result.

20. The non-transitory computer-accessible storage medium as recited in claim 16, wherein the node is configured to:
store a flow state metadata entry corresponding to the first packet; and
transmit, prior to causing the second packet to be transmitted, the flow state metadata entry to another node of the network address translator, wherein the other node is configured to store a replica of the flow state metadata entry.

* * * * *